(12) United States Patent
Gupta et al.

(10) Patent No.: US 11,721,054 B2
(45) Date of Patent: *Aug. 8, 2023

(54) SYSTEMS, METHODS, AND MEDIA FOR HIGH DYNAMIC RANGE QUANTA BURST IMAGING

(71) Applicant: Wisconsin Alumni Research Foundation, Madison, WI (US)

(72) Inventors: Mohit Gupta, Madison, WI (US); Sizhuo Ma, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/521,177

(22) Filed: Nov. 8, 2021

(65) Prior Publication Data
US 2022/0067997 A1    Mar. 3, 2022

Related U.S. Application Data

(63) Continuation of application No. 16/844,899, filed on Apr. 9, 2020, now Pat. No. 11,170,549.

(51) Int. Cl.
*G06T 11/60* (2006.01)
*G06T 3/00* (2006.01)
(Continued)

(52) U.S. Cl.
CPC .......... *G06T 11/60* (2013.01); *G06T 3/0093* (2013.01); *G06T 5/009* (2013.01); *G06T 5/20* (2013.01);
(Continued)

(58) Field of Classification Search
CPC ........ G06T 5/009; G06T 3/0093; G06T 5/20; G06T 7/30; G06T 11/60;
(Continued)

(56) References Cited

U.S. PATENT DOCUMENTS 11,240,445 B2 * 2/2022 Lajevardi ............. H04N 13/296
2014/0313387 A1 * 10/2014 Vogelsang ......... H04N 5/35527
348/308
(Continued)

OTHER PUBLICATIONS

Becker, W., 2012. Fluorescence lifetime imaging-techniques and applications. Journal of Microscopy 247, 2 (2012). 119-136.
(Continued)

*Primary Examiner* — Wesner Sajous
(74) *Attorney, Agent, or Firm* — Quarles & Brady, LLP

(57) ABSTRACT

In accordance with some embodiments, systems, methods and media for high dynamic range quanta burst imaging are provided. In some embodiments, the system comprises: an image sensor comprising single photon detectors in an array; a processor programmed to: generate a sequence of binary images representing a scene; divide the sequence of binary images into blocks; generate block-sum images from the blocks; determine alignments between the block-sum images and a reference block-sum image; warp the sequence of binary images based on the alignments; generate warped block-sum images using warped binary images; merge the warped block-sum images; display a final image of the scene based on the merged warped block-sum images.

20 Claims, 13 Drawing Sheets

(51) Int. Cl.
*G06T 7/30* (2017.01)
*G06T 5/00* (2006.01)
*G06T 5/20* (2006.01)
*G06K 9/34* (2006.01)
*H04N 5/253* (2006.01)
*H04N 19/43* (2014.01)

(52) U.S. Cl.
CPC ...... *G06T 7/30* (2017.01); *G06T 2207/20208* (2013.01); *G06T 2207/20221* (2013.01)

(58) Field of Classification Search
CPC .......... G06T 2207/20208; G06T 2207/20221; G06K 9/00228; G06K 9/40; G06K 9/4609; H04N 5/2258; H04N 5/23251; H04N 5/3535; H04N 5/355; H04N 19/53; H04N 19/43; H04N 19/51; H04N 19/00; H04N 23/80; H04N 23/743; H04N 25/68; H04N 5/253; H04N 23/81; H04N 25/60; H04N 25/67; H04N 23/682
See application file for complete search history.

(56) References Cited

U.S. PATENT DOCUMENTS

| | | | | |
|---|---|---|---|---|
| 2015/0312463 | A1* | 10/2015 | Gupta | H04N 5/2355 348/239 |
| 2016/0335778 | A1* | 11/2016 | Smits | G06T 7/20 |
| 2018/0180733 | A1* | 6/2018 | Smits | H04N 13/383 |
| 2020/0036918 | A1* | 1/2020 | Ingle | H01L 27/14621 |
| 2020/0335546 | A1* | 10/2020 | Miura | H01L 27/14603 |

OTHER PUBLICATIONS

Brox, T. et al., "High Accuracy Optical Flow Estimation Based on a Theory for Warping," in European Conference on Computer Vision (ECCV), 2014, vol. 3024, pp. 25-36.

Bruschini, C. et al., 2019. Single-photon SPAD imagers in biophotonics: Review and Outlook. arXiv preprint (2019).

Buades, A. et al., "A Non-Local Algorithm for Image Denoising," in IEEE Computer Society Conference on Computer Vision and Pattern Recognition (CVPR), vol. 2, pp. 60-65, IEEE, 2005.

Chandramouli, P. et al., "A Bit Too Much? High Speed Imaging from Sparse Photon Counts," in IEEE International Conference on Computational Photography (ICCP), (Tokyo, Japan), pp. 1-9, May 2019. arXiv: 1811.02396.

Choi, J.H. et al., "Image Reconstruction for Quanta Image Sensors Using Deep Neural Networks," in IEEE International Conference on Acoustics, Speech and Signal Processing (ICASSP), (Calgary, AB), pp. 6543-6547, IEEE, Apr. 2018.

Fossum et al., "The Quanta Image Sensor: Every Photon Counts," Sensors, 16, 16, 1260 (2016).

Gyongy, I. et al., "Object Tracking and Reconstruction with Quanta Image Sensor," in International Image Sensor Workshop (IISW), p. 5, 2017.

Gyongy, I et al., "Single-Photon Tracking for High-Speed Vision," Sensors, vol. 18, p. 323, Jan. 2018.

Hasinoff, SW et al., "Burst photography for high dynamic range and low-light imaging on mobile cameras," ACM Trans. Graph., vol. 35, No. 6, pp. 1-12, Nov. 2016.

Horn, BKP et al., "Determining optical flow," Artificial Intelligence, vol. 17, No. 1-3, pp. 185-203, 1981.

Ilg, E. et al., "FlowNet 2.0: Evolution of Optical Flow Estimation with Deep Networks," arXiv:1612.01925 [cs], Dec. 2016.

Ingle, A. et al., "High Flux Passive Imaging with Single-Photon Sensors," in IEEE Conference on Computer Vision and Pattern Recognition (CVPR), pp. 6760-6769, 2019.

Iwabuchi, K. et al., "Iterative Image Reconstruction for Quanta Image Sensor by using Variance-based Motion Estimation," in International Image Sensor Workshop (IISW), p. 4, 2019.

Liba, O. et al., "Handheld mobile photography in very low light," ACM Transactions on Graphics, vol. 38, pp. 1-16, Nov. 2019.

Liu, Z. et al., "Fast Burst Images Denoising," ACM Transactions on Graphics, vol. 33, pp. 1-9, Nov. 2014.

Sun, D. et al., "PWC-Net: CNNs for Optical Flow Using Pyramid, Warping, and Cost Volume," arXiv:1709.02371 [cs], Sep. 2017.

Sun, D. et al., "Secrets of Optical Flow Estimation and Their Principles," in IEEE Conference on Computer Vision and Pattern Recognition (CVPR), 2010, pp. 2432-2439.

Uklu, A.C. et al., "A 512 × 512 SPAD Image Sensor With Integrated Gating for Widefield FLIM," IEEE Journal of Selected Topics in Quantum Electronics, vol. 25, pp. 1-12, Jan. 2019.

Wronski, B. et al., "Handheld Multi-Frame Super-Resolution," ACM Trans. Graph., vol. 38, No. 4, pp. 1-8, Jul. 2019.

Zach, C. et al., "A Duality Based Approach for Realtime TV-L 1 Optical Flow," Pattern Recognition, vol. 1, No. 1, pp. 214-223, 2007.

Zappa, F. et al., "Principles and features of single-photon avalanche diode arrays," Sensors and Actuators A: Physical, vol. 140, pp. 103-112, Oct. 2007.

Zarghami, M. et al., "High Dynamic Range Imaging with TDC-Based CMOS SPAD Arrays," Instruments, vol. 3, p. 38, Aug. 2019.

* cited by examiner

SYSTEMS, METHODS, AND MEDIA FOR HIGH DYNAMIC RANGE QUANTA BURST IMAGING

CROSS-REFERENCE TO RELATED APPLICATIONS

This application is a continuation of U.S. patent application Ser. No. 16/844,899, filed Apr. 9, 2020, which is hereby incorporated herein by reference in its entirety for all purposes.

STATEMENT REGARDING FEDERALLY SPONSORED RESEARCH

This invention was made with government support under HR0011-16-C-0025 awarded by the DOD/DARPA. The government has certain rights in the invention.

BACKGROUND

Conventional digital camera image sensors typically capture hundreds to thousands of photons per pixel to create an image. Recently, single-photon avalanche diodes (SPADs) that can detect individual photons, and precisely measure the time-of-arrival, have become more prevalent. SPADs are driving the development of new devices with novel functionalities due to the sensitivity and picosecond time resolution that can be achieved, such as imaging at very high frame rates (e.g., in excess of a billion frames per second), non-line-of-sight (NLOS) imaging, and microscopic imaging of nano time-scale bio-phenomena.

However, these new SPAD-based imaging techniques are typically active, where the SPAD is used in precise temporal synchronization with an active light source (e.g., a pulsed laser). This includes applications such as NLOS imaging, LiDAR, and microscopy. Due to the output of a SPAD (e.g., a detection of a single photon at a precise time), SPADs are not as well suited to more conventional imaging tasks, such as capturing images of a scene under passive, uncontrolled illumination (e.g., sunlight, moonlight). While passive SPAD-based imaging systems could potentially expand the scope of SPADs to a considerably larger set of applications, including machine vision and photography, images generated from passive SPAD-based data has so far been of relatively low quality compared to images captured using conventional image sensors.

Accordingly, new systems, methods, and media for high dynamic range quanta burst imaging are desirable.

SUMMARY

In accordance with some embodiments of the disclosed subject matter, systems, methods, and media for high dynamic range quanta burst imaging are provided.

In accordance with some embodiments of the disclosed subject matter, a system for generating digital images is provided, the system comprising: an image sensor comprising a plurality of detectors configured to detect arrival of individual photons, the plurality of detectors arranged in an array; a display; at least one processor that is programmed to: cause the image sensor to generate a sequence of binary images representing a scene, each of the binary images comprising a plurality of pixels; divide the sequence of binary images into a plurality of blocks, including a reference block, a first auxiliary block, and a second auxiliary block, such that a set of binary images is associated with each of the plurality of blocks; generate a reference block-sum image based on the set of binary images associated with the reference block; generate a first auxiliary block-sum image based on the set of binary images associated with the first auxiliary block; generate a second auxiliary block-sum image based on the set of binary images associated with the second auxiliary block; determine an alignment between the first auxiliary block-sum image and the reference block-sum image; determine an alignment between the second auxiliary block-sum image and the reference block-sum image; generate a first set of warped binary images by warping at least a first subset of binary images in the set of binary images associated with the first auxiliary block based on the alignment between the first auxiliary image and the reference block-sum image; generate a first warped block-sum image based on the first set of warped binary images; generate a second set of warped binary images by warping at least a second subset of binary images in the set of binary images associated with the second auxiliary block based on the alignment between the second auxiliary image and the reference block-sum image; generate a second warped block-sum image based on the second set of warped binary images; generate a third set of warped binary images by warping at least a third subset of binary images in the set of binary images associated with the reference block based on an alignment between the reference block-sum image and an adjacent block-sum image; generate a third warped block-sum image based on the third set of warped binary images; merge a plurality of warped block-sum images, including at least the first warped block-sum image, the second warped block-sum image, and the third warped block-sum image; and cause the display to present a final image of the scene based on the merged plurality of warped block-sum images.

In some embodiments, each of the plurality of detectors comprises a single photon avalanche diode.

In some embodiments, each of the binary images represents photons detected by the image sensor during an exposure time $\tau$, for each binary image, the plurality of pixels consists of a first subset of pixels each having a value of 1, and a second subset of pixels each having a value of 0, the first subset of pixels corresponding to detectors that detected a photon during exposure time $\tau$, and the second subset of pixels corresponding to detectors that did not detect any photons during exposure time $\tau$.

In some embodiments, each of the plurality of pixels of each binary image has a position (x, y), the reference block-sum image comprises a plurality of pixels, each having a position (x, y), each of the plurality of pixels of the reference block-sum image having a value based on the relationship:

$$S(x, y) = \sum_{t=i}^{j} B_t(x, y),$$

where $B_t(x, y)$ is the binary frame at time t, the reference block includes binary images captured between times i and j, and S(x, y) is the total number of photons detected at (x, y) over the set of binary images associated with the reference block.

In some embodiments, the at least one processor is further programmed to: generate a reference image pyramid based on the reference block-sum image generate a first auxiliary image pyramid based on the first auxiliary block-sum image; generate a second auxiliary image pyramid based on the second auxiliary block-sum image; perform a hierarchical patch-based matching between the reference block-sum pyramid and the first auxiliary block-sum pyramid; determine the alignment between the first auxiliary block-sum image and the reference block-sum image based on the hierarchical patch-based matching; perform a hierarchical patch-based matching between the reference block-sum pyramid and the second auxiliary block-sum pyramid; and determine the alignment between the second auxiliary block-sum image and the reference block-sum image based on the hierarchical patch-based matching;

In some embodiments, the at least one processor that is further programmed to: determine weights to assign to pixels of each of the plurality of warped block-sum images by applying Wiener frequency-domain filtering; assign the weights to the pixels of each of the plurality of warped block-sum images; and combine the warped block-sum images, such that the merged plurality of warped block-sum images is the sum of weighted warped block sum images and represents the total number of photons detected at each pixel location.

In some embodiments, the at least one processor that is further programmed to: estimate an image intensity $\hat{\phi}$ for each of the plurality of pixels of the merged plurality of warped block-sum images based on a total number of photons S(x, y) detected at each pixel location (x, y) using the relationship:

$$\hat{\phi}(x, y) = -\ln\frac{1 - \frac{S(x, y)}{n_q}}{\tau\eta} - \frac{r_q(x, y)}{\eta}$$

where $n_q$ is a total number of binary images in the sequence of binary images, $\tau$ is an exposure time of each binary image, $\eta$ is a quantum efficiency of each of the plurality of detectors, and $r_q(x, y)$ is a dark count rate of the pixel at location (x, y).

In some embodiments, the at least one processor that is further programmed to: calculate a motion field for the first auxiliary block based on the alignment between the first auxiliary block and the reference block; perform a linear interpolation between the motion filed and a motion field associated with an adjacent block; and determine a motion field for each binary image in the first subset of binary images based on the linear interpolation.

In some embodiments, the image sensor further comprises a plurality of color filters arranged in a Bayer pattern, such that each of the plurality of detectors is associated with a red filter, a green filter, or a blue filter; and wherein the at least one processor is further programmed to: generate the reference block-sum image by generating a summation of the set of binary images associated with the reference block, and downsampling the summation of the set of binary images associated with the reference block by combining groups of four adjacent pixels corresponding to two green filters, one red filter, and one blue filter, such that the reference block-sum image is a downsampled grayscale representation of the reference block; generate the first auxiliary block-sum image by generating a summation of the set of binary images associated with the first auxiliary block, and downsampling the summation of the set of binary images associated with the first auxiliary block by combining groups of four adjacent pixels corresponding to two green filters, one red filter, and one blue filter, such that the reference block-sum image is a downsampled grayscale representation of the first auxiliary block; generate a second auxiliary block-sum image by generating a summation of the set of binary images associated with the second auxiliary block, and downsampling the summation of the set of binary images associated with the second auxiliary block by combining groups of four adjacent pixels corresponding to two green filters, one red filter, and one blue filter, such that the reference block-sum image is a downsampled grayscale representation of the second auxiliary block; generate a first set of warped block-sum images based on the first set of warped binary images, wherein the first set of warped block-sum images includes the first warped block-sum image, a first blue warped block-sum image, and a first red warped block-sum image, the first warped block-sum image based on only green pixels, the first blue warped block-sum image based on only blue pixels, and the first red warped block-sum image based on only red pixels; generate a set of second warped block-sum images based on the second set of warped binary images, wherein the second set of warped block-sum images includes the second warped block-sum image, a second blue warped block-sum image, and a second red warped block-sum image; generate a set of third warped block-sum images based on the third set of warped binary images, wherein the third set of warped block-sum images includes the third warped block-sum image, a third blue warped block-sum image, and a third red warped block-sum image; merge the plurality of warped block-sum images to generate a green color sum image; merge a second plurality of warped block-sum images, including the first blue warped block-sum image, the second blue warped block-sum image, and the third blue warped block-sum image, to generate a blue color sum image; merge a third plurality of warped block-sum images, including the first red warped block-sum image, the second red warped block-sum image, and the third red warped block-sum image, to generate a blue color sum image; and generate the final image based on a combination of the green color sum image, the blue color sum image, and the red color sum image.

In accordance with some embodiments of the disclosed subject matter, a method for generating digital images is provided, the method comprising: causing an image sensor to generate a sequence of binary images representing a scene, each of the binary images comprising a plurality of pixels, the image sensor comprising a plurality of detectors configured to detect arrival of individual photons, the plurality of detectors arranged in an array; dividing the sequence of binary images into a plurality of blocks, including a reference block, a first auxiliary block, and a second auxiliary block, such that a set of binary images is associated with each of the plurality of blocks; generating a reference block-sum image based on the set of binary images associated with the reference block; generating a first auxiliary block-sum image based on the set of binary images associated with the first auxiliary block; generating a second auxiliary block-sum image based on the set of binary images associated with the second auxiliary block; determining an alignment between the first auxiliary block-sum image and the reference block-sum image; determining an alignment between the second auxiliary block-sum image and the reference block-sum image; generating a first set of warped binary images by warping at least a first subset of binary images in the set of binary images associated with the first auxiliary block based on the alignment between the first auxiliary image and the reference block-sum image; generating a first warped block-sum image based on the first set of warped binary images; generating a second set of warped binary images by warping at least a second subset of binary images in the set of binary images associated with the second auxiliary block based on the alignment between the second auxiliary image and the reference block-sum image; generating a second warped block-sum image based on the second set of warped binary images; generating a third set of warped binary images by warping at least a third subset of binary images in the set of binary images associated with the reference block based on an alignment between the reference block-sum image and an adjacent block-sum image; generating a third warped block-sum image based on the third set of warped binary images; merging a plurality of warped block-sum images, including at least the first warped block-sum image, the second warped block-sum image, and the third warped block-sum image; and causing a display to present a final image of the scene based on the merged plurality of warped block-sum images.

In accordance with some embodiments of the disclosed subject matter, a non-transitory computer readable medium containing computer executable instructions that, when executed by a processor, cause the processor to perform a method for generating digital images is provided, the method comprising: causing an image sensor to generate a sequence of binary images representing a scene, each of the binary images comprising a plurality of pixels, the image sensor comprising a plurality of detectors configured to detect arrival of individual photons, the plurality of detectors arranged in an array; dividing the sequence of binary images into a plurality of blocks, including a reference block, a first auxiliary block, and a second auxiliary block, such that a set of binary images is associated with each of the plurality of blocks; generating a reference block-sum image based on the set of binary images associated with the reference block; generating a first auxiliary block-sum image based on the set of binary images associated with the first auxiliary block; generating a second auxiliary block-sum image based on the set of binary images associated with the second auxiliary block; determining an alignment between the first auxiliary block-sum image and the reference block-sum image; determining an alignment between the second auxiliary block-sum image and the reference block-sum image; generating a first set of warped binary images by warping at least a first subset of binary images in the set of binary images associated with the first auxiliary block based on the alignment between the first auxiliary image and the reference block-sum image; generating a first warped block-sum image based on the first set of warped binary images; generating a second set of warped binary images by warping at least a second subset of binary images in the set of binary images associated with the second auxiliary block based on the alignment between the second auxiliary image and the reference block-sum image; generating a second warped block-sum image based on the second set of warped binary images; generating a third set of warped binary images by warping at least a third subset of binary images in the set of binary images associated with the reference block based on an alignment between the reference block-sum image and an adjacent block-sum image; generating a third warped block-sum image based on the third set of warped binary images; merging a plurality of warped block-sum images, including at least the first warped block-sum image, the second warped block-sum image, and the third warped block-sum image; and causing a display to present a final image of the scene based on the merged plurality of warped block-sum images.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
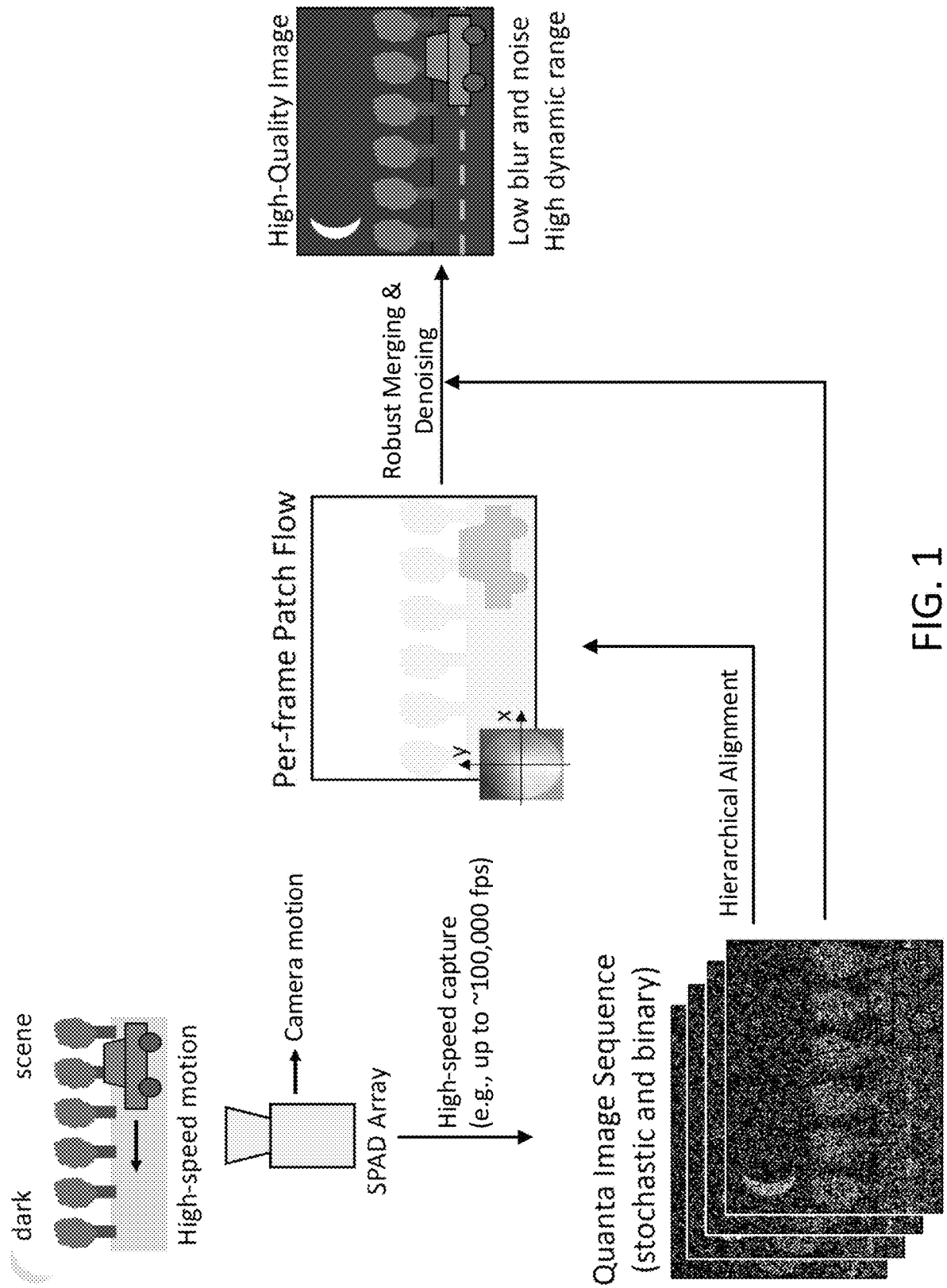
FIG. 1 shows an example of a flow for quanta burst imaging in accordance with some embodiments of the disclosed subject matter.

In accordance with various embodiments, mechanisms (which can, for example, include systems, methods, and media) for high dynamic range quanta burst imaging are provided.

In accordance with some embodiments of the disclosed subject matter, mechanisms described herein can be used to implement a camera with an array of single photon detectors (e.g., an array of SPAD pixels) configured to image a scene illuminated by passive lighting (e.g., ambient light, such as the sun, the moon, room lighting, etc.). As described below, because photons arrive at the sensor randomly according to Poisson statistics, photon detection events are also random, and can be visualized as a spatio-temporal photon-cube. In some embodiments, a camera implemented using an array of single photon detectors (e.g., an array of SPAD pixels) can capture a sequence of thin (e.g., short duration), temporal slices of the photon-cube, where each slice is a binary (1-bit) image. In such embodiments, each pixel location can be encoded as a 1 if the detector corresponding to the pixel location received one or more photons during the temporal extent of the slice, and can be encoded as a 0 otherwise. For example, a recently described SPAD camera (described in Ulku et al., "A 512×512 SPAD Image Sensor with Integrated Gating for Widefield FLIM," IEEE Journal of Selected Topics in Quantum Electronics, vol. 25, pp. 1-12 (January 2019), which is hereby incorporated by reference herein in its entirety), can be configured to capture $10^5$ binary frames per second at ⅛ megapixel resolution (e.g., by reading half of the pixels from the image sensor). Due to the random nature of photon arrivals, the binary images are stochastic.

In general, if the scene and/or image sensor moves during acquisition, photons emitted by a scene point get misaligned and spread over multiple pixels, regardless of whether those pixels are conventional pixels or based on single photon detectors (e.g., using SPADs), which causes blurring in conventional digital images. In some embodiments, mechanisms described herein can use one or more computational photography techniques to computationally re-aligns the photons received over a sequence of binary frames along motion trajectories to achieve high-quality images in challenging scenarios, including low-light and high-speed motion. Techniques described herein are sometimes referred to as quanta burst imaging techniques. In some embodiments, mechanisms described herein can align a sequence of binary images captured by an array of single photon detectors, thus creating a high-bit-depth, high-dynamic-range image of the scene, with reduced noise and motion blur. Additionally, in some embodiments, mechanisms described herein can use one or more sub-pixel alignment techniques (e.g., as described below in connection with FIGS. 7 and 10), to generate a super-resolved image of the scene that has a resolution that is higher than the resolution of the array. Note that while quanta burst imaging can be considered a limiting case as compared to conventional burst imaging techniques due to each binary image capturing approximately one photon per pixel, and thus being extremely noisy and quantized (1-bit), due to high frame rates that can be achieved with single photon detectors, such as SPADs, mechanisms described herein can generate much longer sequences of images (e.g., on the order of $10^2$ to $10^5$ frames, depending on various parameters, such as light level, dynamic range, and motion), instead of 5-10 images as in conventional burst photography.

The raw binary frames produced by a SPAD-based array do not include read noise. By dividing a total exposure time into a long sequence of frames that each have a short duration, the absence of read noise and short frame duration results in virtually negligible intra-frame motion blur and low noise, even for rapid motion (e.g., sports and wildlife photography). By contrast, in conventional digital cameras there is a fixed read noise penalty for each captured frame. Therefore, dividing the exposure time finely into a large number of frames increases the effective read noise in the merged image. Additionally, as described below in connection with FIG. 2, although SPADs, due to their high sensitivity, are especially useful in photon-starved scenarios, SPADs are also well suited to imaging bright scenes where conventional sensors saturate. This is because although each binary image is quantized, a large collection of single-photon measurements, when combined, naturally avoids saturation, and thus, can achieve extreme dynamic range.

In some embodiments, mechanisms described herein can be used to generate high quality images using a sequence of binary images of a scene generated using an image sensor implemented using an array of detectors that are capable of detecting single photons at relatively high frame rates. For example, such an image sensor can be implemented using an array of SPADs. Until recently, arrays of single photon detectors were limited in size, and accordingly limited to specialized applications. For example, SPADs were available as single-pixel or small arrays (e.g., up to 32×32 pixels), which were sufficient for several scientific imaging applications and specialized active imaging scenarios (e.g., LiDAR), bur are not suitable for consumer domain imaging due to the very low resolution. However, due to the compatibility of SPAD technology with mainstream CMOS fabrication techniques, larger SPAD arrays (e.g., on the order of megapixels) have recently been developed that are capable of maintaining high sensor quality, while operating at room temperature. SPAD arrays can achieve very high frame rates in comparison to conventional image sensors (e.g., CMOS active pixel sensors) on the order of tens of thousands of frames per second to in excess of one hundred thousand frames per second (i.e., SPAD arrays can be configured to generate binary frames at rates of 1,000+ fps, 10,000+ fps, and even 100,000+ fps) with zero read noise.

As another example, jot-based sensor arrays with very small pixel pitch (e.g., sub-2 micron) that are capable of detecting the arrival of a single photon have been implemented using CMOS technology. For example, jot-based sensors are described in Fossum et al., "The Quanta Image Sensor: Every Photon Counts," Sensors, 16, 1260 (2016), which is hereby incorporated by reference herein in its entirety. Jot-based devices have a higher fill factor and lower dark current than SPADs, but non-negligible read noise. Note that although mechanisms described herein are generally described in connection with SPADs, this is merely an example, and mechanisms described herein can be used in connection with any type of quanta image sensor, SPAD-based arrays and jot-based arrays being two current examples. Of these two examples, SPAD-based image sensors can be configured to temporally oversample the incoming light (e.g., by generating frames at very high frame rates), and jots can spatially oversample the incident light using the higher fill factor (e.g., based on the smaller pixel pitch that can be achieved with jots).

FIG. 1 shows an example of a flow for quanta burst imaging in accordance with some embodiments of the disclosed subject matter. As shown in FIG. 1, a camera implemented using a SPAD-based array can generate a sequence of binary images of a scene at a very high frame rate compared to conventional imaging (e.g., on the order of thousands of frames per second to a hundred thousand frames per second). In FIG. 1, the scene depicted is a scene with relatively low ambient light (e.g., provided mostly by moonlight), and varying speed (e.g., a car moving relatively quickly to the left, and the camera moving to the right with respect to the background).

In some embodiments, the SPAD-based array can generate a sequence of binary images of the scene, and the sequence of binary images can be aligned (e.g., using techniques described below in connection with FIGS. 6 and 7), and the alignment of the frames can be used modify the frames for merging to generate a high quality image with a high dynamic range compared to the dynamic range that can be achieved by a single digital image (e.g., as described below in connection with FIGS. 6, 7, and 10). Additionally, in some embodiments, one or more techniques can be applied to reduce noise in the final image (e.g., as described below in connection with FIGS. 6, 7, and 9).

In general, for a SPAD-based pixel array observing a scene, the number of photons $Z(x, y)$ arriving at pixel $(x, y)$ during an exposure time of $\tau$ seconds can be modeled as a Poisson random variable, which can be represented using the following relationship:

$$P\{Z=k\} = \frac{(\phi\tau\eta)^k e^{-\phi\tau\eta}}{k!}, \quad (1)$$

where $\phi(x, y)$ is the photon flux (photons/seconds) incident at $(x, y)$. $\eta$ is the quantum efficiency. In some embodiments, a SPAD-based pixel array can be configured such that each pixel detects at most one photon during an exposure time, returning a binary value $B(x, y)$ such that $B(x, y)=1$ if $Z(x, y) \geq 1$; $B(x, y)=0$ otherwise. Due to the randomness in photon arrival, $B(x, y)$ can also be modeled as a random variable with Bernoulli distribution, which can be represented using the following relationships:

$$P\{B=0\}=e^{-(\phi\tau\eta+r_q\tau)},$$

$$P\{B=1\}=1-e^{-(\phi\tau\eta+r_q\tau)}, \quad (2)$$

where $r_q$ is the dark count rate (DCR), which is the rate of spurious counts unrelated to photons.

In some embodiments, the number of incident photons $\phi$ (proportional to the linear intensity image of the scene) at a particular pixel can be estimated by capturing a sequence of binary frames of the scene, and adding the number of photon detections in each pixel. As described above in connection with EQS. (1) and (2), the arrival of photons is random and proportional to the flux incident from the scene. Accordingly, if enough time points are sampled, the count of detections is representative of the brightness of the scene point corresponding to the pixel assuming no motion between binary frames, or that the binary frames are aligned perfectly to compensate for motion. Accordingly, the sum of all binary frames can be defined as $S(x, y)$, and can be represented by the following relationship:

$$S(x, y) = \sum_{t=1}^{n_q} B_t(x, y), \quad (3)$$

where $B_t(x, y)$ is the binary frame at time t, and $n_q$ is the number of frames, and $S(x, y)$ is the total number of photons detected at $(x, y)$ over the entire binary image sequence. Since each binary frame is independent, the expected value of the sum image is the product of the number of frames $n_q$, and the expected value of the Bernoulli variable B, which can be represented by the following relationship:

$$E[S(x,y)]=n_q E[B(x,y)]=n_q(1-e^{-(\phi\tau\eta+r_q\tau)}), \quad (4)$$

A maximum likelihood estimator (MLE) of the intensity image $\phi$ can be represented using the following relationship:

$$\hat{\phi}(x,y)=-\ln(1-S(x,y)/n_q)/\tau\eta - r_q(x,y)/\eta, \quad (5)$$

where $\hat{\phi}$ is the estimated image intensity. Accordingly, in some embodiments, the estimated image intensity can be estimated directly, based on the sum image value $S(x, y)$, the number of frames $n_q$, and properties of the array, assuming that the binary frames have been properly aligned.

Figure 2:
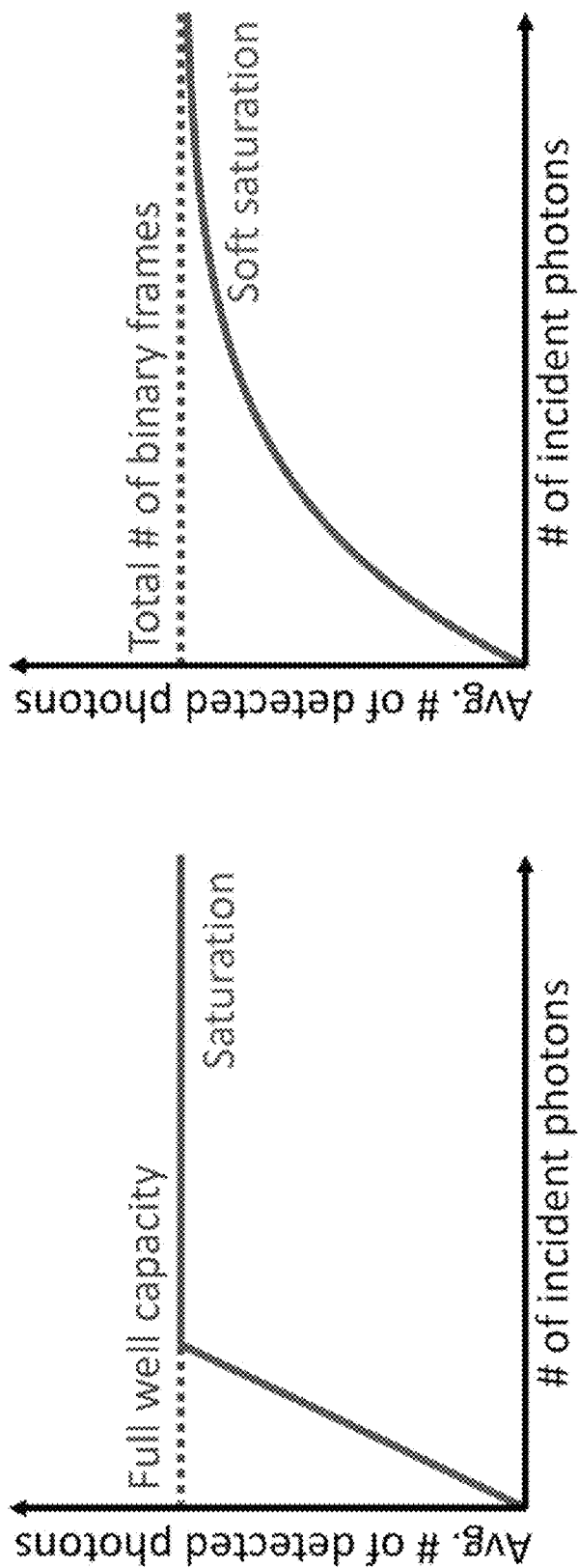
FIG. 2 shows a comparison of a response curve of a conventional light detector, and a response curve of a single photon avalanche diode detector that can be used to generate high dynamic range image data in accordance with some embodiments of the disclosed subject matter.

FIG. 2 shows a comparison of a response curve of a conventional light detector, and a response curve of a single photon avalanche diode detector that can be used to generate high dynamic range image data in accordance with some embodiments of the disclosed subject matter. As shown in FIG. 2, in a conventional image sensor (e.g., a CMOS active pixel sensor, or a CCD-based image sensor), there is a linear relationship between the total number of photons S detected by the detector, and $\phi$, the number of photons incident on the camera (the quantity that is estimated to generate a final image) until the well reaches full capacity and saturates. In a SPAD-based sensor implemented in accordance with some embodiments of the disclosed subject matter, the relationship between the total number of photons S detected by the detector, and $\phi$, the number of photons incident on the camera is non-linear. Instead of reaching a saturation point, past which the sensor has no dynamic range, the response curve for the SPAD-based sensor asymptotically approaches its maximum value ($n_q$), while never reaching it. Such a response curve can be referred to as soft saturation, which suggests that the value of S keeps increasing (albeit progressively slowly) as the number of incident photons increases. Accordingly, the incident flux can be recovered even for extremely bright scenes. In contrast, the response curve for conventional sensors is a straight line before hitting the full well capacity, and then becomes flat due to saturation. Therefore, a passive SPAD camera, while capable of imaging low-light scenes, somewhat counter-intuitively, can also image scenes that include very bright light where conventional sensors saturate (and scenes that include both portions of bright light and portions of low light), thus providing an extremely wide dynamic range.

Note that conventional image sensors convert discrete incident photons to analog current, which is then converted to a discrete number by an analog-to-digital converter (ADC). This discrete-analog-discrete pipeline results in substantial read noise, which is the dominant source of noise in low-light. This places a limit on the number of short-exposure frames that can be used in conventional burst photography. Accordingly, using conventional burst photography techniques, given a fixed total capture time there is a tradeoff between motion artifacts and read noise. Increasing the number of frames may reduce motion artifacts, but since each additional frames incurs a read noise penalty, beyond a threshold number of frames (which may depend on the amount of light in the scene) the SNR of the merged image is lowered. In contrast, SPAD-based arrays directly measure photon counts, skipping the intermediate discrete to analog conversion and analog to digital conversion, thereby avoiding read noise. This allows a camera implemented using a SPAD-based array to divide the exposure time into a large number $n_q$ of binary frames for motion compensation without any SNR penalty, thereby simultaneously achieving low motion-blur and high SNR.

Figure 3:
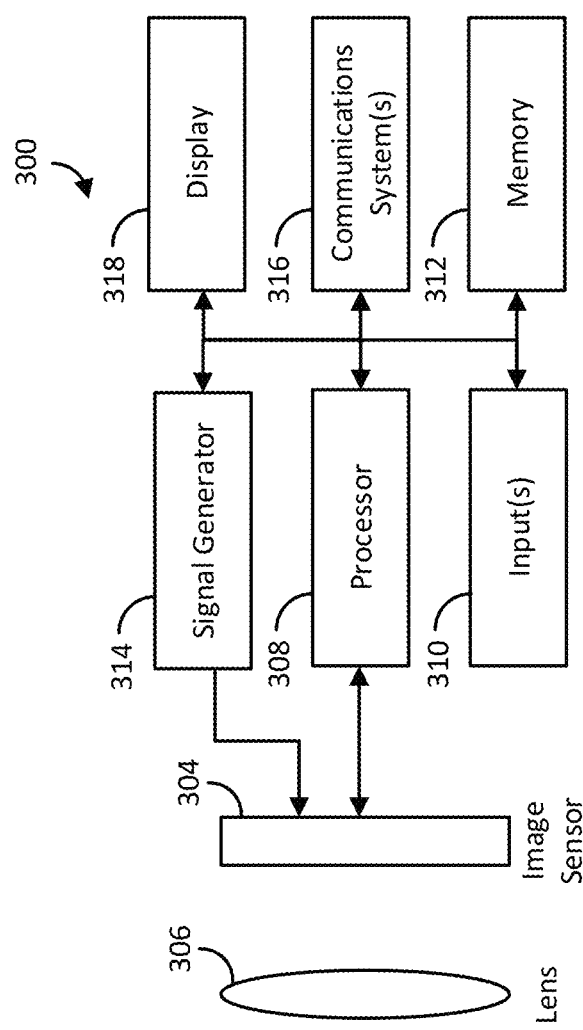
FIG. 3 shows an example of a system for high dynamic range quanta burst imaging in accordance with some embodiments of the disclosed subject matter.

FIG. 3 shows an example 300 of a system for high dynamic range quanta burst imaging in accordance with some embodiments of the disclosed subject matter. As shown, system 300 can include an image sensor 304 (e.g., an area sensor that includes an array of single photon detectors); optics 306 (which can include, for example, one or more lenses, one or more attenuation elements such as a filter, a diaphragm, and/or any other suitable optical elements such as a beam splitter, etc.); a processor 308 for controlling operations of system 400 which can include any suitable hardware processor (which can be a central processing unit (CPU), a digital signal processor (DSP), a microcontroller (MCU), a graphics processing unit (GPU), etc.) or combination of hardware processors; an input device/display 310 (such as a shutter button, a menu button, a microphone, a touchscreen, a motion sensor, a liquid crystal display, a light emitting diode display, etc., or any suitable combination thereof) for accepting input from a user and/or from the environment, and/or for presenting information (e.g., images, user interfaces, etc.) for consumption by a user; memory 312; a signal generator 314 for generating one or more signals to control operation of image sensor 304; a communication system or systems 316 for facilitating communication between system 300 and other devices, such as a smartphone, a wearable computer, a tablet computer, a laptop computer, a personal computer, a server, an embedded computer (e.g., for controlling an autonomous vehicle, robot, etc.), etc., via a communication link; and a display 318. In some embodiments, memory 312 can store image data, and/or any other suitable data. Memory 312 can include a storage device (e.g., a hard disk, a Blu-ray disc, a Digital Video Disk, RAM, ROM, EEPROM, etc.) for storing a computer program for controlling processor 308. In some embodiments, memory 312 can include instructions for causing processor 308 to execute processes associated with the mechanisms described herein, such as processes described below in connection with FIGS. 6, 7, and 10.

In some embodiments, image sensor 304 can be an image sensor that is implemented at least in part using an array of SPAD detectors (sometimes referred to as a Geiger-mode avalanche diode) and/or one or more other detectors that are configured to detect the arrival time of individual photons. In some embodiments, one or more elements of image sensor 304 can be configured to generate data indicative of the arrival time of photons from the scene via optics 306. For example, in some embodiments, image sensor 304 can be an array of multiple SPAD detectors. As yet another example, image sensor 304 can be a hybrid array including SPAD detectors and one or more conventional light detectors (e.g., CMOS-based pixels). As still another example, image sensor 304 can be multiple image sensors, such as a first image sensor that includes an array of SPAD detectors that can be used to generate information about the brightness of the scene and a second image sensor that includes one or more conventional pixels that can be used to generate information about the colors in the scene. In such an example, optics can included in optics 306 (e.g., multiple lenses, a beam splitter, etc.) to direct a portion of incoming light toward the SPAD-based image sensor and another portion toward the conventional image sensor.

In some embodiments, system 300 can include additional optics. For example, although optics 306 is shown as a single lens, it can be implemented as a compound lens or combination of lenses. Note that although the mechanisms described herein are generally described as using SPAD-based detectors, this is merely an example of a single photon detector. As described above, other single photon detectors can be used, such as jot-based image sensors.

In some embodiments, signal generator 314 can be one or more signal generators that can generate signals to control image sensor 304. For example, in some embodiments, signal generator 314 can supply signals to enable and/or disable one or more pixels of image sensor 304 (e.g., by controlling a gating signal of a SPAD used to implement the pixel). As another example, signal generator 314 can supply signals to control readout of image signals from image sensor 308 (e.g., to memory 312, to processor 308, to a cache memory associated with image sensor 304, etc.).

In some embodiments, system 300 can communicate with a remote device over a network using communication system(s) 316 and a communication link. Additionally or alternatively, system 300 can be included as part of another device, such as a smartphone, a tablet computer, a laptop computer, an autonomous vehicle, a robot, etc. Parts of system 300 can be shared with a device within which system 300 is integrated. For example, if system 300 is integrated with an autonomous vehicle, processor 308 can be a processor of the autonomous vehicle and can be used to control operation of system 300.

In some embodiments, system 300 can communicate with any other suitable device, where the other device can be one of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, the other device can be implemented as a digital camera, security camera, outdoor monitoring system, a smartphone, a wearable computer, a tablet computer, a personal data assistant (PDA), a personal computer, a laptop computer, a multimedia terminal, a game console, a peripheral for a game counsel or any of the above devices, a special purpose device, etc.

Communications by communication system 316 via a communication link can be carried out using any suitable computer network, or any suitable combination of networks, including the Internet, an intranet, a wide-area network (WAN), a local-area network (LAN), a wireless network, a digital subscriber line (DSL) network, a frame relay network, an asynchronous transfer mode (ATM) network, a virtual private network (VPN). The communications link can include any communication links suitable for communicating data between system 300 and another device, such as a network link, a dial-up link, a wireless link, a hard-wired link, any other suitable communication link, or any suitable combination of such links.

In some embodiments, display 318 can be used to present images and/or video generated by system 300, to present a user interface, etc. In some embodiments, display 318 can be implemented using any suitable device or combination of devices, and can include one or more inputs, such as a touchscreen.

It should also be noted that data received through the communication link or any other communication link(s) can be received from any suitable source. In some embodiments, processor 308 can send and receive data through the communication link or any other communication link(s) using, for example, a transmitter, receiver, transmitter/receiver, transceiver, or any other suitable communication device.

Figure 4:
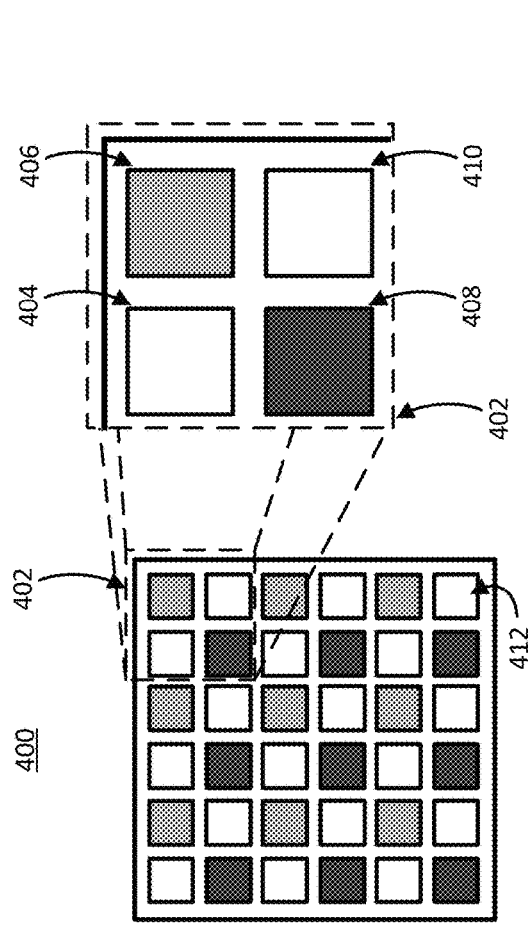
FIG. 4 shows an example of an image sensor that includes single photon detectors in accordance with some embodiments of the disclosed subject matter.

FIG. 4 shows an example 400 of an image sensor that includes single photon detectors in accordance with some embodiments of the disclosed subject matter. As shown in FIG. 4, image sensor 400 can be a monochrome image sensor (i.e., not including individual color filters associated with one or more pixels) or a color image sensor (i.e., including individual color filters associated with one or more pixels) implemented using SPAD pixels. In some embodiments, pixels of image sensor 400 can be associated with any suitable filters, such as an infrared cut filter that reduces the amount of infrared light that can be received by the pixel, a neutral density filter that reduces the total amount of light that can be received by the pixel, a color filter that reduces the amount of light outside a particular color band that can be received by the pixel, etc. For example, as shown in FIG. 4, pixels of image sensor 400 can be configured as a repeating pattern of a group 402 of four pixels, with each pixel being associated with a different filter (e.g., a different color filter, arranged in a Bayer pattern. In a more particular example, a first SPAD pixel 404 of group 402 can be associated with a green filter, a second SPAD pixel 406 can be associated with a red filter, a third SPAD pixel 408 can be associated with a blue filter, and a fourth SPAD pixel 410 can be associated with another green filter. FIG. 4 also depicts a pixel 412 located on another portion of image sensor 400. In general, brightness can be expected to be relatively similar at pixels within group 402, whereas at pixel 412 the brightness is more likely to be significantly differently. Accordingly, for a pixel associated with a particular color filter, brightness values for neighboring pixels can be used to interpolate the brightness for the other two colors. For example, a green value for pixel 408 can be inferred based on the values of pixels 404 and 410 (and the other two closest neighbors) using known techniques.

Figure 5B:
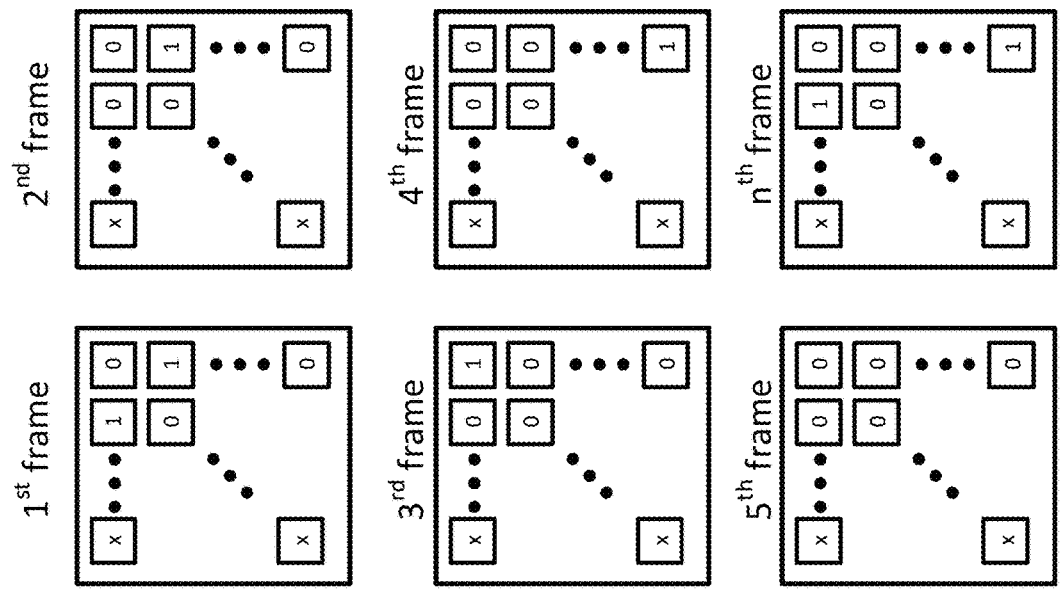
FIG. 5B shows an example of various binary frames corresponding to the photons detected in the example of FIG. 5A.
Figure 5A:
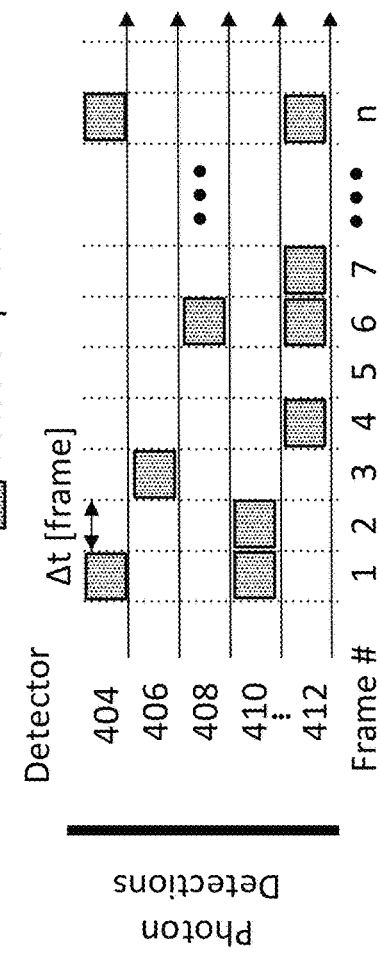
FIG. 5A shows an example of photons detected by single-photon detectors of a single photon detector-based image sensor over various frames in accordance with some embodiments of the disclosed subject matter.

FIG. 5A shows an example of photons detected by single-photon detectors of a single photon detector-based image sensor over various frames in accordance with some embodiments of the disclosed subject matter. For the purposes of the example shown in FIG. 5A, it is assumed that group 402 is exposed to white light of relatively uniform brightness, and that the brightness of the scene at pixel 412 is higher. As shown in FIG. 5A, a photon is not detected at each frame at each pixel, and although the pixels within group 402 are exposed to uniform light, pixel detections are not correlated between the pixels. As described above in connection with FIG. 1 and EQS. (1) and (2), photon arrivals from the scene are random and can be modeled as a Poisson distribution, and arrivals at neighboring pixels are not correlated as each SPAD photon detection is an independent event. However, when the scene is brighter, more photon detections generally occur.

As shown in FIG. 5A, one frame can correspond to a time period $\Delta t$. The time period $\Delta t$ can include an exposure time i during which the detectors are active, and may include a reset period during which the sensors are inactive. For example, SPAD detectors enter a dead time after detection of a photon during which another photon detection cannot occur. In some embodiments, for a sensor that includes an array of SPAD sensors, time period $\Delta t$ can include an exposure time $\tau$, and a reset period following the exposure time that allows any SPAD that detected a photon at the end of exposure time $\tau$ to complete the dead time prior to the next frame. Additionally, the reset period can be used to read out data from the image sensor. For example, in a SPAD-based image sensor, each frame can include a period for read out and reset of the SPADs, which can be a small fraction of the exposure time. In a more particular example, at a very high frame rate (e.g., ~100,000 fps), each frame can correspond to a time period $\Delta t$ of 10.24 microseconds (µs), with the exposure period i during which photons can be detected accounting for 10.2 µs, and the time period dedicated to read out and/or reset during which photons cannot be detected accounting for 40 nanoseconds.

FIG. 5B shows an example of various binary frames corresponding to the photons detected in the example of FIG. 5A. As shown in FIG. 5B, each binary frame can be depicted as an array of zeros and ones, where a pixel that detected a photon within a particular frame can be assigned a value of 1, and a pixel that did not detect a photon can be assigned a value of 0. In some embodiments, the frames can be represented using any suitable data structure, and using any suitable compression. For example, the frames can be represented as a matrix (e.g., a 2D matrix representing an individual frame, a 3D matrix representing a sequence of frames), a string of binary values (e.g., the frame can be output as a string of binary values without demarcations for individual lines). As another example, any suitable compression can be applied, such as run length compression, delta encoding, etc.

Figure 6:
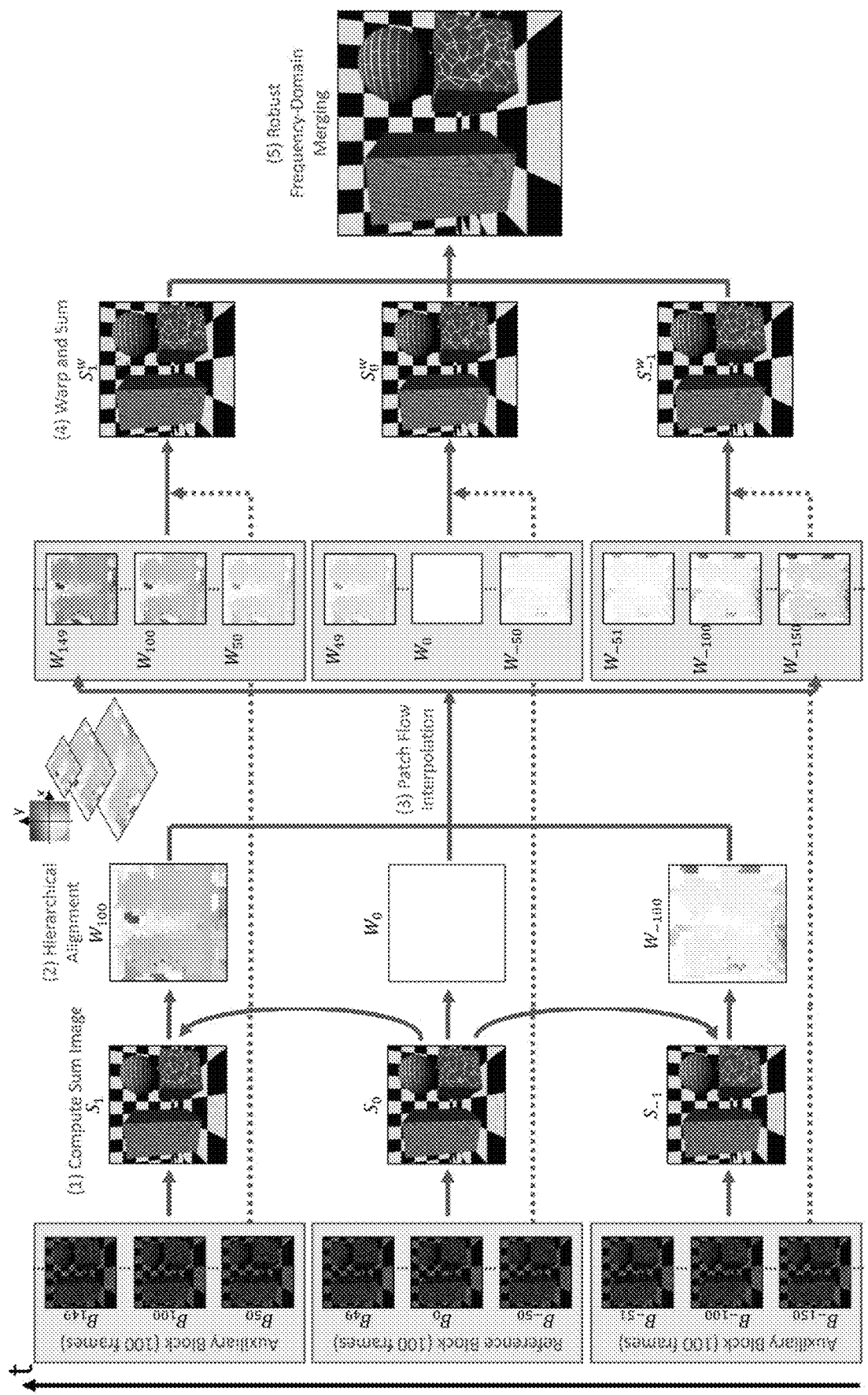
FIG. 6 shows an example of a flow for generating a high dynamic range image from a sequence of binary images captured by an image sensor that includes single photon detectors in accordance with some embodiments of the disclosed subject matter.

FIG. 6 shows an example of a flow for generating a high dynamic range image from a sequence of binary images captured by an image sensor that includes single photon detectors in accordance with some embodiments of the disclosed subject matter. As described above in connection with EQS. (3) and (5), the image intensity can be estimated based on the the total number of photons $S(x, y)$ detected at pixel $(x, y)$. However, if the scene and/or camera moves during capture of the binary sequence of frames, then simply summing the binary sequence as described above in connection with EQ. (3) can lead to merging of photons from different scene points, resulting in motion blur and/or incorrect estimation of image intensity. Accordingly, in some embodiments, mechanisms described herein can align the binary frames to compensate for inter-frame motion before merging the frames, which can reduce motion blur and increase the likelihood that the photons being merged (e.g., represented by a "1" in a particular binary frame) originated from the same scene point.

Unlike in a conventional image, each individual binary frame has an extremely low SNR. This makes aligning the binary frames directly using conventional techniques very difficult, because such conventional techniques rely on a brightness constancy assumption between frames which does not hold for the observed random binary signal. Although it may be possible to estimate inter-frame motion when the motion is a global, low-dimensional transform such as global 2D translation or global homography, such technique are not suitable for general, unstructured scenes with unknown geometry. In some embodiments, mechanisms described herein can use a transform that is formulated as a pixelwise 2D motion field (or optical flow). In such a formulation, the total number of unknown parameters to estimate is 2MN for image resolution M×N. Such a complex, high-dimensional motion model cannot be solved precisely using the random binary input data.

However, SPADs can be configured to capture binary frames at high frame rates (e.g., a SPAD-based image sensor with a frame rate of about 100,000 frames per second is described in Ulku et al., "A 512×512 SPAD Image Sensor with Integrated Gating for Widefield FLIM," which has been incorporated by reference herein). At sufficiently high frame rates, the velocity at each pixel can be treated as a constant within a local temporal window. This constancy can be used as an additional constraint to solve the otherwise challenging optical flow problem on stochastic binary frames. In some embodiments, such a constraint can be incorporated by computing a temporally coherent optical flow. Alternatively, in some embodiments, a simpler, less computationally intensive approach can be used to incorporate such a constraint.

As shown in FIG. 6, a sequence of binary frames were generated of a simulated high dynamic range scene, with camera motion. As described below in connection with FIG. 12, the binary frames were generated using a simulated SPAD-based image sensor. Although only 300 binary frames are depicted in FIG. 6, the resulting final image depicted in FIG. 6, and in FIGS. 8A to 9C are based on 2000 frames. As shown in FIG. 6, the image sequence can be divided into non-overlapping temporal blocks, a sum image can be computed for each block (which are sometimes referred to as block-sum images), and the block-sum images can be aligned. In general, the block-sum images have a higher SNR than individual binary frames, which makes it possible to use traditional optical flow techniques to align the blocks. However, as described below in connection with FIGS. 8B and 8C, while aligning at the block level can produce relatively high quality images, incorporating additional techniques after block level alignments can produce higher quality images.

Figure 8C:
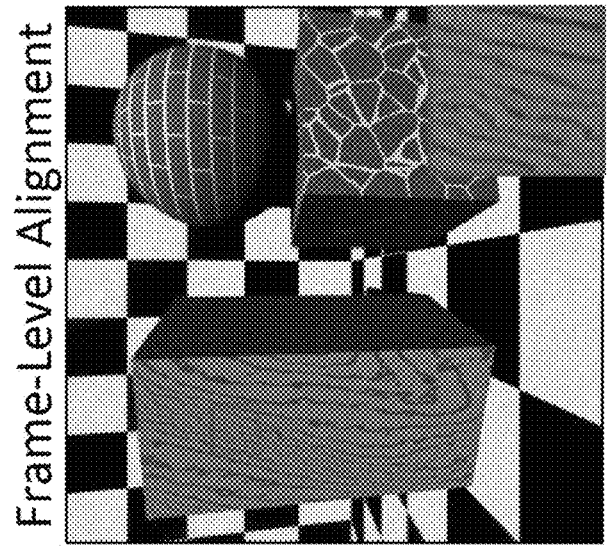
FIG. 8C shows an example of a high dynamic range image generated from a sequence of binary images using block-level alignment and frame level alignment techniques implemented in accordance with some embodiments of the disclosed subject matter.
Figure 8B:
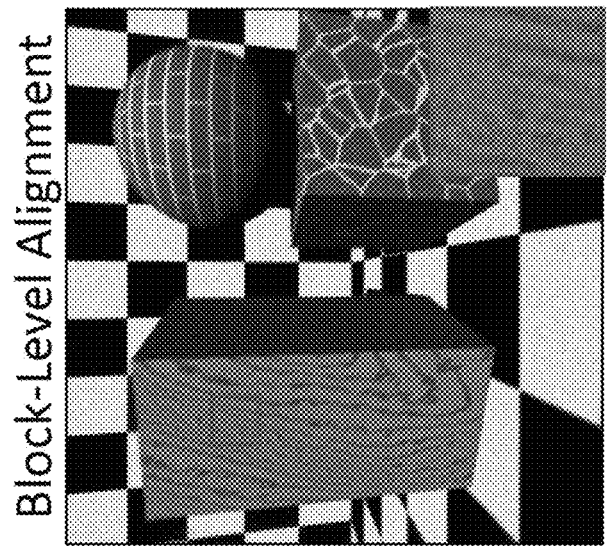
FIG. 8B shows an example of a high dynamic range image generated from a sequence of binary images using a block-level alignment technique implemented in accordance with some embodiments of the disclosed subject matter.

As shown in FIG. 6, a block in the center of the sequence can be referred to as the reference block, and all other blocks can be referred to as auxiliary blocks. In some embodiments, each auxiliary block can be aligned to the reference block. While after aligning the block-sum images, the coarse-temporal-scale motion field between temporal blocks can be used to merge the blocks directly, for scenes with motion, this can result in lower quality images (e.g., as shown in FIG. 8B). Instead, in some embodiments, the motion field can be linearly interpolated in time to obtain motion between binary frames. This finer-scale motion field can be used to warp each binary frame and align to a central reference frame within the reference block, before merging. This hierarchical approach can remove the motion blur within each temporal block, resulting in sharp images even for fast moving scenes. In some embodiment, after warping, a frequency-space merging algorithm can be used to merge the temporal blocks, which can provide robustness to small alignment errors.

As shown in FIG. 6, given a reference block and an auxiliary block, a 2D correspondence map can be computed between the two blocks based on the appearance of the blocks (e.g., based on the intensity of the pixels). In some embodiments, a patch-based alignment approach can be used (e.g., rather than a pixel-wise optical flow approach) as such a patch-based approach since is generally more resilient to noise than pixel-wise optical flow. Note that as used herein, unless otherwise indicated explicitly or by context, "blocks" generally refer to the temporal sum of frames, and "patches" generally refer to spatial windows of pixels within an image (e.g., which can be a block-sum image, or an individual binary frame). Additionally, as described below in connection with FIGS. 9A to 9C, patch-based approaches achieve more robust results than pixel-based merging in low SNR images. In some embodiments, for patch-based merging, it can be sufficient to compute a motion field at the patch level, which can reduce computational complexity.

In some embodiments, any suitable technique can be used to perform patch alignment. For example, a hierarchical patch alignment approach can be implemented that uses an image pyramid generated from the block-sum images. In some embodiments, the number of pyramid levels can be adjusted based on the spatial resolution of the binary images. In a more particular example, for the relatively low resolution SPAD-based image sensors that are currently being produced (e.g., on the order of ¼ to ½ megapixel) a 3-level pyramid can be used. In another more particular example, as the resolution of SPAD-based image sensors increase, or if techniques described herein are used in connection with other types of image sensors (e.g., jot-based image sensors), additional pyramid levels can be added at about 1 level per 4× increase in resolution in any dimension. However, this is merely an example, and the number of levels can be set based on desired accuracy and computing resources (e.g., more levels can produce greater accuracy, but requires more computing resources). In some embodiments, mechanisms described herein can perform matching between blocks by minimizing L1 matching error in a spatial neighborhood. For example, in such embodiments, for a patch with indices (p, q), which can cover an area surrounding the pixel indices that can be defined as [pM, (p+1)M−1]×[qM, (q+1)M−1], mechanisms described herein can determine the smallest motion vector (u, v) that minimizes the following relationship:

$$E_d(u, v; p, q) = \sum_{x=pM}^{(p+1)M-1} \sum_{y=qM}^{(q+1)M-1} |S_{aux}(x + u, y + v) - S_{ref}(x, y)|, \quad (6)$$

where the size of the patch is M×M, $S_{aux}$ is the auxiliary block-sum image, and $S_{ref}$ is the reference block-sum image.

In some embodiments, mechanisms described herein can perform a global regularization at the finest level of the pyramid to further refine the patch alignment results (which can be especially helpful for blocks with a very small number of photons, such as a block in which there are fewer than 10 photons per pixel). Additionally, as described below in connection with FIG. 10, global regularization can be applied to provide sub-pixel alignment in order to facilitating merging the frames to produce a super-resolution image. In some embodiments, mechanisms described herein can perform the regularization by minimizing an energy that is represented by the following relationship:

$$E_d(u, v; p, q) = \sum_{x=pM}^{(p+1)M-1} \sum_{y=qM}^{(q+1)M-1} |S_{aux}(x+u, y+v) - s_{ref}(x, y)|, \quad (6)$$

where $\Omega_{pq}=[0, W/M] \times [0, H/M]$ is the spatial domain for the patch indices p, q, u, v are the motion fields defined on $\Omega_{pq}$, H×W is the spatial resolution of the input images, and $E_d$ is the matching error defined in EQ. (6). In some embodiments, Charbonnier loss, defined as $\rho(x) = \sqrt{x^2 + E^2}$ can be minimized as a differential alternative for the L1 loss. In such embodiments, x can be the vector for which the norm is to be found (e.g., $\nabla u$ and $\nabla v$ in this case), and E is a small constant to ensure that the Charbonnier loss is differentiable.

In some embodiments, the inter-block motion that is computed (e.g., using patch alignment techniques described above) can be treated as motion between the center frames of each block. In such embodiments, an interpolation can be performed to compute the motion between individual frames within each block. For example, linear interpolation can be performed to compute the motion between individual frames within each block. Note that higher-order interpolation (e.g., cubic or spline) may improve the temporal smoothness, but increases the dependency on other blocks. As shown in FIGS. 12 and 13A to 13D, linear interpolation achieved good results for SPADs with high temporal resolution.

In some embodiments, after determining the motion between individual frames, each frame can be warped based on the inter-frame motion, and a warped block-sum image can be generated based on the warped frames. In such embodiments, by warping the frames before generating a block-sum image, the pixels can be realigned such that the information from the same scene points is combined with fewer errors (e.g., less blurring) in the warped block-sum image in comparison to the original block-sum images generated from the raw binary frames.

In some embodiments, for example, as described below in connection with 714 of FIG. 7 and FIGS. 9A to 9C, any suitable technique or combination of technique can be used to merge the warped block-sum images, and to create a final image. For example, as described below in connection with FIGS. 9A to 9C, a Wiener frequency-domain filtering technique can be applied to correct errors during merging of the warped block-sum images. As another example, a linear image (e.g., based on the estimated image intensity can be generated based on the count of photons at each pixel (e.g., representing the non-linear response of the SPAD-based image sensor). As yet another example, gamma correction, tone mapping, and/or other image processing techniques can be applied to enhance the quality of the final image.

Figure 7:
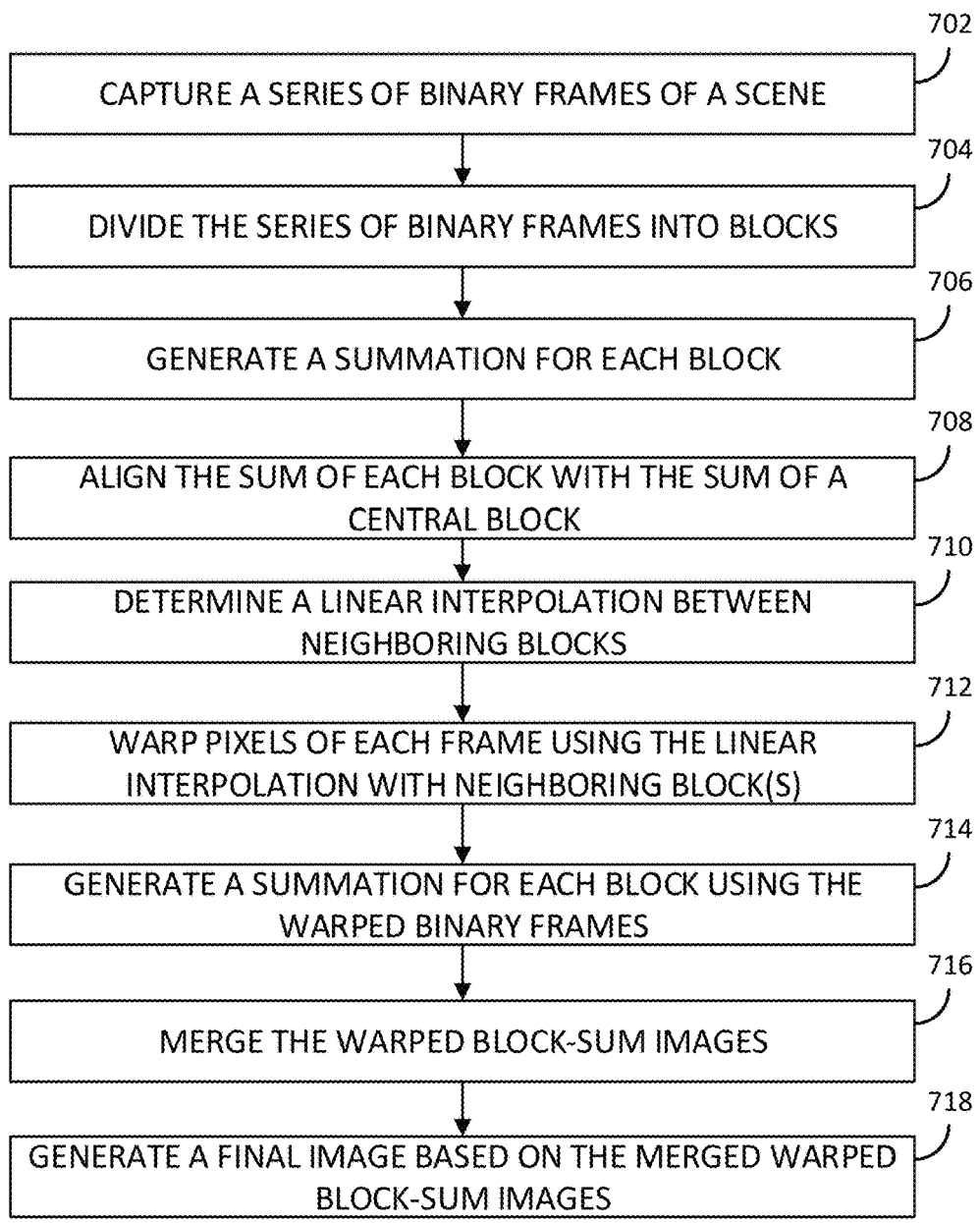
FIG. 7 shows an example of a process for high dynamic range quanta burst imaging in accordance with some embodiments of the disclosed subject matter.

FIG. 7 shows an example of a process for high dynamic range quanta burst imaging in accordance with some embodiments of the disclosed subject matter. At 702, process 700 can capture a sequence of binary frames of a scene using any suitable image sensor. For example, as described above in connection with FIGS. 3 and 4, the image sensor can be a SPAD-based image sensor, or a jot-based image sensor. However, these are merely examples, and mechanisms described herein can be used to generate high quality, high dynamic range images using any sensor that include single photon detectors.

In some embodiments, process 700 can cause the sequence of frames can be captured at any suitable frame rate and/or within any suitable time budget. For example, process 700 can cause the sequence of frames to be captured with a high frame rate in situations where there is likely to be scene motion and/or high scene intensity. In a more particular example, the frame rate can set between about 300 fps and about 100,000 fps for current SPAD-based image sensors. As another more particular example, the frame rate can set between about 30 fps and about 1,000 fps for current jot-based image sensors.

In some embodiments, the total time budget can be in a range from about 1 millisecond to about 1 second. In a particular example, the total time budget can be in a range from about 10 milliseconds to about 1 second for scenes with relatively high dynamic range. In some embodiments, the total time budget can be constrained based on the amount of motion in the scene, as it is more difficult to generate a high quality image for scenes with more motion for longer time budgets and/or more binary frames, especially if an object moves outside of the scene during the time budget. Additionally, in some embodiments, the total time budget can be constrained based on the amount of available memory, as a longer time budget and/or more binary frames requires additional memory availability that can be written to at speeds that are comparable to the frame rates of the image sensor.

In some embodiments, the total time budget can be omitted, and a stream of binary frames can be captured, with a sequence of binary frames corresponding to a particular time period selected after the frames have already been captured. For example, process 700 can cause binary frames of a scene to be captured continuously, and a sequence of frames can be selected from the continuously captured sequence at any suitable time for use in generating an image.

At 704, process 700 can divide the sequence of binary frames into any suitable number of blocks. In some embodiments, the sequence of binary images can be divided into blocks of a particular size (e.g., blocks of 100 frames) and/or into an equal number of blocks (e.g., five equal sized blocks). In some embodiments, blocks can include at least a minimum number of binary frames to ensure that when added together the binary frames generate a block-sum image with sufficient information to perform alignment (e.g., as described below in connection with 708). For example, in some embodiments, each block can include at least 20 binary frames. In some embodiments, the maximum number of binary frames included in each block can depend on the amount of motion in the scene. For example, as described below in connection with FIGS. 11A to 11C, if a scene includes relatively fast motion (e.g., due to movement of one or more objects in the scene and/or due to motion of the camera), shorter total exposure time can generally generate higher quality images. In such an example, smaller block sizes can also be used to generate higher quality images, as the total amount of motion within the block is generally reduced as the total number of binary frames included in the block is reduced, thereby reducing the likelihood that each block violates the assumption that inter-frame velocity is relatively constant within the block. However, as block size is reduced, the amount of computational resources used to process the same number of binary frames is increased. For example, if 1,000 frames are divided into blocks of 100 binary frames each, fewer block-level operations are performed (e.g., fewer alignments, fewer block-level Weiner filtering operations) than if the same 1,000 frames are divided into blocks of 50 binary frames each. In some embodiments, the number of frames in a block can be between about 20 and about 500. However, this is merely an example, and a different number of binary frames per block may be appropriate based on the amount of scene motion, the scene brightness, and/or the amount of computing resources available.

In some embodiments, one or more portions of the binary frames captured at 702 can be omitted from the blocks generated at 704. For example, an image can be generated from a subset of the binary frames, in which case the remaining binary frames can be omitted from the blocks that are generated at 704. Additionally or alternatively, in some embodiments, multiple images can be generated from different subsets of the binary frames, in which case different portions of the binary frames can be omitted from the blocks generated at 704 for each image to be generated.

At 706, process 700 can generate a summation for each block of binary frames (e.g., a block-sum image) by adding the value at each pixel. For example, if each block includes 100 binary frames, each pixel of the block-sum image has a value in a range of [0,100], as the maximum value would be realized if a particular pixel was a "1" in each frame, and the minimum value would be realized if a particular pixel was a "0" in each frame. Note that because of the random nature of pixel arrival times, extreme values are relatively unlikely.

At 708, process 700 can align the block-sum images using a reference block-sum image. In some embodiments, any suitable technique can be used to align each block-sum image to the reference block-sum image. For example, as described above in connection with FIG. 6, one or more patch alignment techniques can be used to determine an alignment between the various block-sum images and the reference block-sum image. Note that, as shown in FIG. 6, the reference block-sum image can be a block-sum image generated from a central block of binary frames, as there is likely to be less motion between the central block and the first block or last block, than between the first black and the last block.

In some embodiments, process 700 can determine whether the amount of motion in the scene represented by the alignments generated at 708 is indicative of excessive non-linear intra-block motion (e.g., an assumption that the velocity is constant at each pixel within the block is not valid), and if the amount of non-linear intra-block motion is excessive, process 700 can return to 704 to divide the sequence of binary frames into smaller blocks such that the amount of non-linear motion within each block is reduced. Additionally or alternatively, in some embodiments, process 700 can determine whether the amount of motion in the scene represented by the alignments generated at 708 is indicative of linear intra-block motion (e.g., the assumption of linear intra-block motion is generally valid), and if the amount of non-linear intra-block motion is low, process 700 can return to 704 to divide the sequence of binary frames into larger blocks such that the total number of blocks is reduced.

In some embodiments, process 700 can perform 704 to 708 using a reduced resolution version of the binary frames (e.g., using every other pixel, every fourth pixel, etc.) to estimate scene motion, and evaluate whether the block size is appropriate. In such embodiments, process 700 can perform 704 to 708 on the reduced resolution binary frames prior to generating blocks of full-resolution binary frames (or higher resolution binary frames) at 704, or in parallel with performing 704 to 708 using the full-resolution binary frames. For example, due to the reduced number of data points, the reduced resolution binary frames can be summed and aligned more quickly, which can reduce the use of computation resources.

In some embodiments, process 700 can also perform a portion of process 700 (e.g., including 704 and 706, but potential including other portions of process 700, such as 708 to 716) to generate data that can be used to determine brightness and/or dynamic range of a scene during capture of the sequence of binary frames at 702 and/or prior to capture of the sequence of capture of the sequence of binary frames at 702. For example, as binary frames are captured at 702 and output, the binary frames can be used to generate data that can be used to determine an average brightness in the scene to determine an appropriate total capture time (e.g., represented by the total number of frames captured multiplied by the length of each frame). In some embodiments, process 700 can use a reduced resolution version of the binary frames to determine the brightness and/or dynamic range of a scene during capture of the sequence of binary frames, and/or prior to capture. If the average brightness is relatively low and/or if at least a portion of the scene includes a portion that is relatively low brightness, the total time budget can be set to be relatively long, which can increase resource use compared to capturing a sequence of images with a shorter total time budget (e.g., increased memory use, increased computational resource use, etc.). In a more particular example, a sequence of frames representing a relatively short total time (e.g., on the order of less than 1 millisecond) can be used to determine brightness and/or dynamic range in the scene, which can be used to dynamically control the total time budget of the sequence of binary frames.

At 710, process 700 can determine a local motion of the pixels within each block based on the alignment of the block-sum images. In some embodiments, any suitable technique or combination of techniques can be used to determine the local motion of the pixels within each block. For example, as described above in connection with FIG. 6, process 700 can perform an interpolation using the alignment of the neighboring blocks to determine the local motion of the pixels between binary frames within the blocks. In a more particular example, process 700 can perform a linear interpolation for each pixel index (x, y), and can use the interpolation to assign a motion to each pixel within the block for which the interpolation is valid. In such an example, for binary frames that fall between two central frames (e.g., frames $B_1$ to $B_{99}$ in FIG. 6), an interpolation based on the alignment of those two blocks can be used to determine pixel motions. However, for binary frames that do not fall between two central frames (e.g., frames $B_{101}$ to $B_{149}$), the interpolation based on the alignment of the two closest blocks can be used to determine pixel motions.

At 712, process 700 can warp the pixels of each binary frame using the local motion determined at 710. In some embodiments, motions determined at 710 can be used to reassign pixel values to a different pixel index for each frame in each block (e.g., except for a central frame, which can be assigned the alignments determined for the block at 708, and can used as a reference frame). For example, if the motion for a pixel at a particular pixel index (x, y) in frame $B_{101}$ in FIG. 6 was determined as being (+1, −1), that pixel can be reassigned to pixel index (x+1, y−1).

At 714, process 700 can generate another summation for each block by using the warped binary frames (e.g., a warped block-sum image) by adding the reassigned values at each pixel. For example, for each pixel of a reference image (e.g., the central binary frame of the block), values that have been reassigned to that pixel's pixel index can be added to the value of that pixel for the reference image. In some embodiments, generation of warped block-sum images at 714 can be omitted. For example, in some embodiments, after estimating inter-frame motion at 710 and warping the binary frames at 712, process 700 can directly compute a sum image of all warped images, and compute the MLE of the sum (e.g., as described above in connection with EQ. (5)). However, the estimated motion field may include errors due to occlusions, motion discontinuities, and non-rigid scene deformations. In this case, simply summing the warped binary images can create strong blurring or ghosting artifacts. While techniques can be applied on a per frame basis to attempt to mitigate some of these errors (e.g., as described below in connection with FIG. 9B), generating warped block-sum images, and performing additional processing using the block-sum images can lead to superior results (e.g., as described below in connection with FIG. 9C).

At 716, process 700 can merge the warped block-sum images. In some embodiments, any suitable technique or combination of techniques can be used to merge the warped block-sum images. For example, in some embodiments, a Wiener frequency-domain filtering technique can applied during merging to reduce noise in the final merged image. Wiener frequency-domain filtering can be used to account for potentially incorrect estimated motion. When applied to conventional imaging, if a patch in a warped frame is significantly different from that in the reference frame, then the alignment is likely erroneous, and the final merged patch can be computed by taking a weighted average of all matched patches, where the patches with large difference with the reference patch (likely erroneous) are given a lower weight. While this approach is successful for conventional cameras, it cannot be directly applied to merge single-photon binary frames, because even if two binary frames are perfectly aligned the difference between the frames may still be high due to the dominating shot noise. As a result, every auxiliary frame will have a low weight, and will make a low contribution to the final merged image, resulting in low SNR (e.g., as shown in FIG. 9B).

In some embodiments, Wiener frequency-domain filtering can be applied at the block level to the warped block-sum images, since the amount of motion within each block is relatively small (assuming that the blocks represent relatively short periods of time), reducing the likelihood of alignment errors. Warping the frames within a block and adding the frames to generate warped block-sum images facilitates removal of motion blur within each block (e.g., as shown in FIG. 8C), and the warped block-sum images have sufficient SNR to apply Wiener filtering to the warped block-sum images in order to stably merge the warped block-sum images to reduce the noise level.

As another example, in some embodiments, in some embodiments, a kernel regression technique can be applied during merging to reduce noise in the final merged image and to generate a final merged image with a resolution that exceeds the resolution of the image sensor used to generate the data (e.g., a super-resolution image). The high-speed single-photon data represented by the sequence of binary frames leads to small inter-frame motion (e.g., on the order of 0.01 pixels per frame), which can be leveraged to generate a merged image that has a higher resolution than the input frames. In such an example, as described below in connection with FIG. 10, rather than computing the weighted average of patches as is done in Wiener filtering, the weighted patches of the warped block-sum images can be treated as a set of sample points, and each patch can be warped to sub-pixel locations on a super-resolution output pixel grid that has a higher-resolution than the binary frames themselves. In some embodiments, process 700 can then scan through each pixel on the super-resolution output grid, and at each pixel can use an anisotropic Gaussian kernel to combine the sample points within a spatial neighborhood. Note that this approach can also use the Wiener frequency-domain filtering described in the preceding example, rather than a point-wise robustness term used in recent conventional burst photography approached. Wiener filter is generally more robust in practice, at the cost of slightly higher computational complexity. Additional details related to the kernel regression techniques are described in Appendix A, which is hereby incorporated by reference herein in its entirety.

At 718, process 700 can generate a final image based on the merged warped block-sum images. In some embodiments, process 700 can apply any suitable technique or combination of techniques to the final sum image to generate the final image. For example, in some embodiments, the final sum image has a nonlinear response curve as a function of the incoming photon flux (e.g., as described above in connection with FIG. 2), and process 700 can invert the non-linear response (e.g., using EQ. (5)) to generate a final linear image based on the estimated image intensities.

As another example, process 700 can apply a gamma correction to the final image to generate an image suitable for viewing. In some embodiments, process 700 can use any suitable gamma correction technique or combination of techniques to generate a gamma corrected image.

As yet another example, process 700 can apply a tone mapping to reveal details in both low light regions and high light regions of the image. In some embodiments, tone mapping can be performed for scenes with high dynamic range. In some embodiments, process 700 can use any suitable tone mapping technique or combination of techniques to generate a tone mapped high dynamic range image.

In some embodiments, process 700 can be used in connection with image data corresponding to multiple color channels (e.g., RGB color filters, which can be arranged in a a Bayer pattern, RGB and white/neutral filters sometimes referred to as RGBW, RYYB, CYYM, etc.), to determine alignment, and the alignment can be used to perform pixel warp for each color channel independently based on the computed alignments, and merged to generated a final image. For example, if the image sensor (e.g., image sensor 304) is associated with a color filter array (e.g., in a Bayer pattern), process 700 can downsample the image data (e.g., in each binary image frame, in each block-sum image). For example, process 700 can spatially group pixels in each binary image frame into 2×2 pixel windows (e.g., each corresponding to a group of RGGB pixels, such as group 402 described above in connection with FIG. 4) and calculate a single grayscale value (e.g., based on the combined pixel count, using a conventional weighting function used to convert RGB to grayscale, etc.). In some embodiments, process 700 can use the downsampled image data to generate alignments for each block (e.g., at 706 and 708), and can use alignments to estimate inter-frame motion for each individual pixel (e.g., at 710). In some embodiments, process 700 can generate separate binary images for each color channel, warp the binary images for each color channel, generate separate warped block-sum images for each color channel, and merge the color channel warped block-sum images (e.g., 712 to 716 can be performed in parallel for each color channel). In some embodiments, any suitable technique or combination of techniques can be used to merge the three final color channel sum images. For example, each final color channel sum image has a nonlinear response curve as a function of the incoming photon flux (e.g., as described above in connection with FIG. 2), and process 700 can invert the non-linear response (e.g., using EQ. (5)) to generate final linear images for each color channel based on the estimated image intensities. As another example, process 700 can use one or more conventional color demosaicking techniques to spatially interpolate the color channels and merge the final linear images for each color channel.

In some embodiments, process 700 can be used in connection with image data corresponding to a single color channel (e.g., a green color filter, a neutral density filter) to determine alignment and/or pixel warp to determine initial intensity values for a final image, and image data corresponding to one or more other color channels can be used to determine color data for a final image. For example, if the image sensor (e.g., image sensor 304) is associated with a color filter array (e.g., in a Bayer pattern), process 700 can use information from a single color channel (e.g., green, which has twice the pixel density in a Bayer filter pattern as red or blue), and the alignments and/or pixel warp information generated for the first color channel can be applied to the other color channels. As another example, if the image sensor (e.g., image sensor 304) is a hybrid image sensor including a SPAD-based array that generates monochrome image data, and an array of conventional CMOS pixels interspersed with the SPAD-based array that generate color image data (e.g., at a lower frame rate), the information from the SPAD-based array can be used to generate intensities of a final image, and information from the conventional CMOS pixels can be used to generate color information.

In some embodiments, process 700 can be used to generate final images in parallel using image data corresponding to multiple different color channels (e.g., RGB color filters, RGB and white/neutral filters sometimes referred to as RGBW, RYYB, CYYM, etc.), and resulting final images from each color channel can be merged using any suitable technique or combination of techniques. For example, the final images can be merged using conventional color interpolation and other image processing techniques used to combine image data from separate color channels. As another example, the final images can be merged using one or more techniques to account for differences in the composition of the final image that are based on differences in the image data generated between the color channels (e.g. resulting from the spatial offset of each color channel).

Figure 8A:
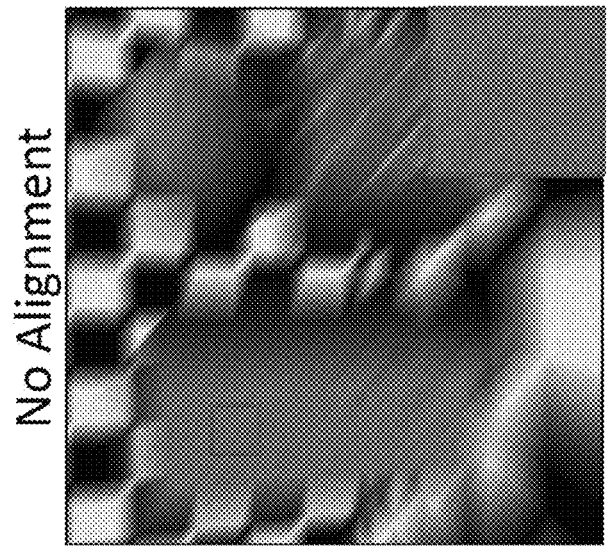
FIG. 8A shows an example of a high dynamic range image generated from a sequence of binary images without aligning the binary frames.

FIG. 8A shows an example of a high dynamic range image generated from a sequence of binary images without aligning the binary frames. The examples shown in FIGS. 8A to 8C were generated using binary frames from an example used in describing the flow depicted in FIG. 6. In the example of FIG. 8A, the image was generated by simply summing all of the individual binary frames. As shown in FIG. 8A, due to motion in the scene and/or camera motion, simply summing the binary images without performing any alignment results in a poor quality image with blurring.

FIG. 8B shows an example of a high dynamic range image generated from a sequence of binary images using a block-level alignment technique implemented in accordance with some embodiments of the disclosed subject matter. The example of FIG. 8B was generated by merging the block-sum images generated without warping based on the alignments (e.g., by omitting 710 to 714 of FIG. 7, and merging the block-sum images generated at 706 using the alignments determined at 708).

FIG. 8C shows an example of a high dynamic range image generated from a sequence of binary images using block-level alignment and frame level alignment techniques implemented in accordance with some embodiments of the disclosed subject matter. The example of FIG. 8C was generated using frame-level alignment techniques described above in connection with 710 to 714 of FIG. 7. As shown in the inset portions of FIGS. 8B and 8C, the frame-level alignment generated a final image of higher quality (e.g., sharper with finer details observable).

Figure 9C:
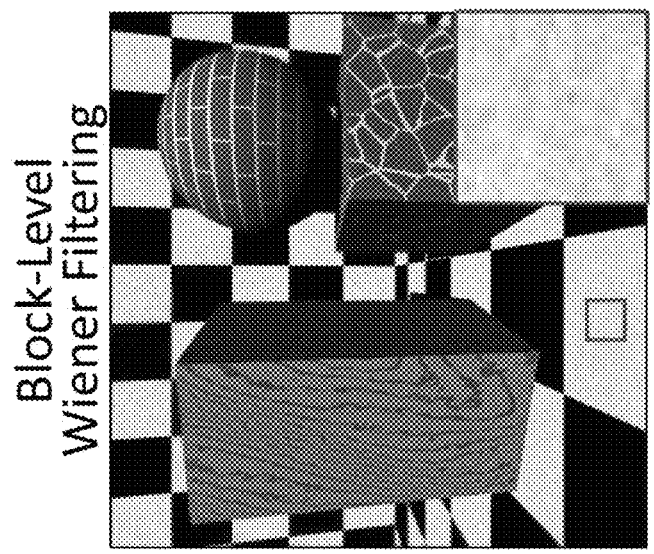
FIG. 9C shows an example of a high dynamic range image generated from a sequence of binary images using a block-level Wiener filtering technique to determine weights to apply to warped and summed blocks of binary image frames during a merging procedure in accordance with some embodiments of the disclosed subject matter.
Figure 9B:
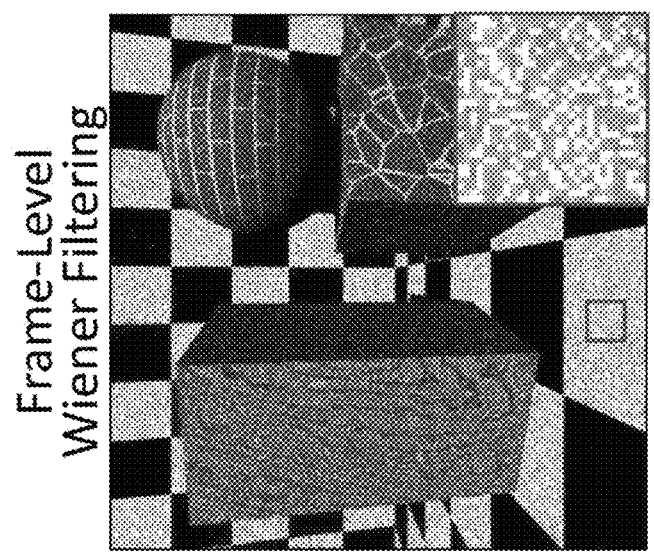
FIG. 9B shows an example of a high dynamic range image generated from a sequence of binary images using a frame-level Wiener filtering technique to determine weights to apply to binary image frames during a merging procedure in accordance with some embodiments of the disclosed subject matter.
Figure 9A:
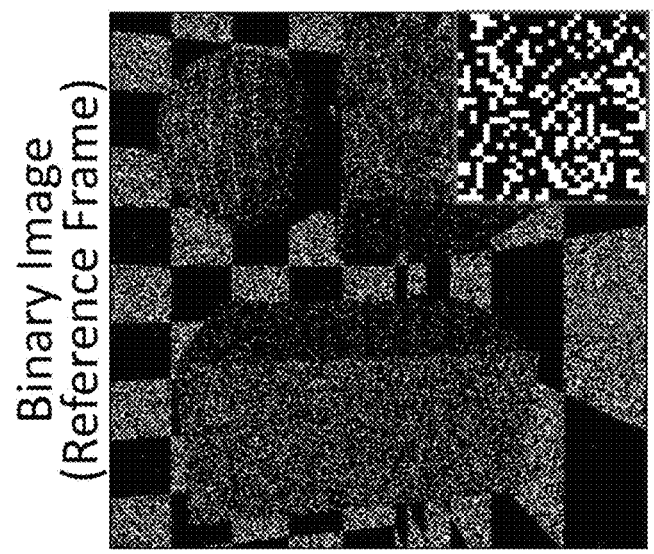
FIG. 9A shows an example of a single binary image captured by an image sensor that includes single photon detectors in accordance with some embodiments of the disclosed subject matter.

FIG. 9A shows an example of a single binary image captured by an image sensor that includes single photon detectors in accordance with some embodiments of the disclosed subject matter. The examples shown in FIGS. 9A to 9C were generated using binary frames from an example used in describing the flow depicted in FIG. 6. As shown in FIG. 9A, while macroscopic shapes in the scene, as well as light and dark regions, can be observed in the individual binary frame, the SNR is very low and details cannot be observed.

FIG. 9B shows an example of a high dynamic range image generated from a sequence of binary images using a frame-level Wiener filtering technique to determine weights to apply to binary image frames during a merging procedure in accordance with some embodiments of the disclosed subject matter. The example of FIG. 9B was generated by applying Winer filtering at the frame level, by comparing patches of individual binary frames.

FIG. 9C shows an example of a high dynamic range image generated from a sequence of binary images using a block-level Wiener filtering technique to determine weights to apply to warped and summed blocks of binary image frames during a merging procedure in accordance with some embodiments of the disclosed subject matter. The example of FIG. 9C was generated by applying Winer filtering at the block level as described above in connection with 716 of FIG. 7. As shown in FIGS. 9B and 9C, the very low SNR in the individual binary frames caused the final image generated using the frame-level Wiener filtering to incorporate noise from the individual frames that was averaged out in the block-sum images used to generate the final image using the block-level Wiener filtering in FIG. 9C.

Figure 10:
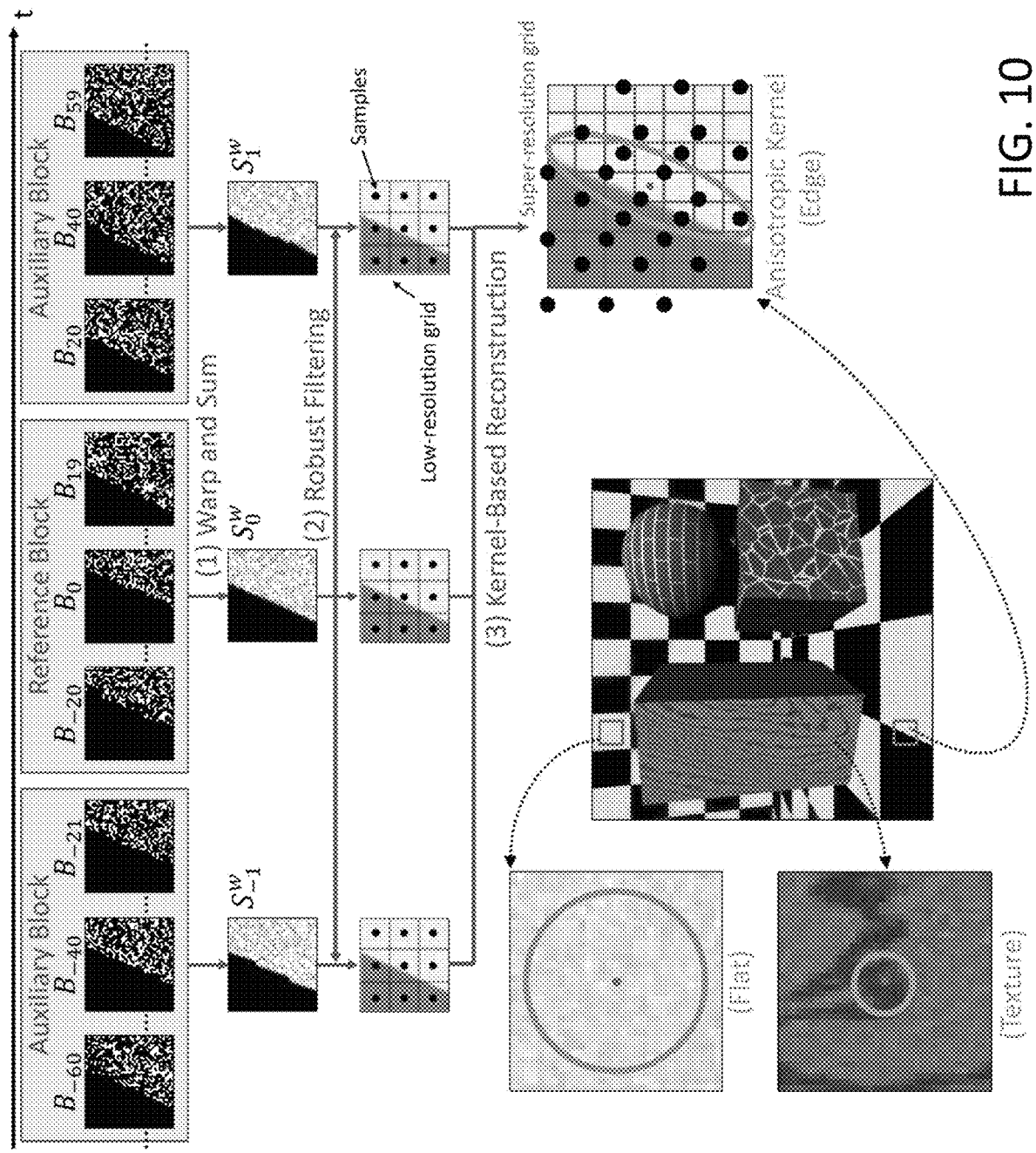
FIG. 10 shows an example of a flow for generating a super-resolution high dynamic range image from a sequence of binary images captured by an image sensor that includes single photon detectors in accordance with some embodiments of the disclosed subject matter.

FIG. 10 shows an example of a flow for generating a super-resolution high dynamic range image from a sequence of binary images captured by an image sensor that includes single photon detectors in accordance with some embodiments of the disclosed subject matter. As shown in FIG. 10, warped block-sum images can be generated (e.g., as described above in connection with 704 to 714 of FIG. 7), and weighted image patches corresponding to portions of the warped block-sum images can be treated as sample points used to fill a super-resolution pixel grid. Each patch can be warped to sub-pixel locations on the super-resolution output pixel grid, and at each pixel an anisotropic Gaussian kernel can be used to combine the sample points within a spatial neighborhood. Note that this approach can also use the Wiener frequency-domain filtering described in the preceding example, rather than a point-wise robustness term used in recent conventional burst photography approached. Additional details are described in Appendix A, which has been incorporated by reference herein.

Figures 11A, 11B, 11C:
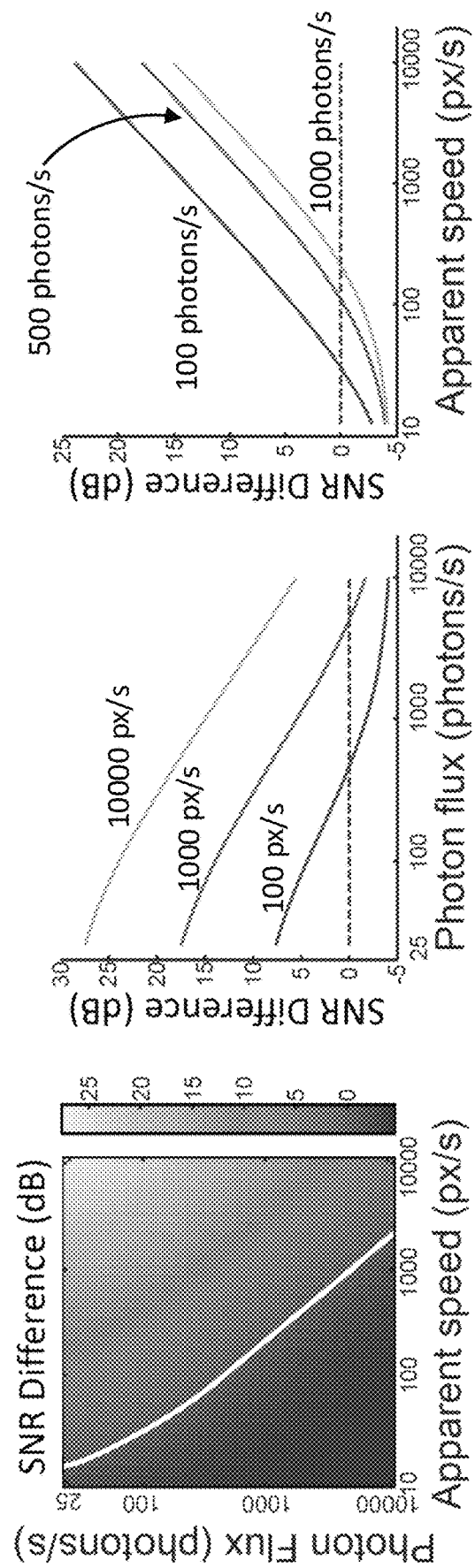
FIG. 11A shows a plot of the difference in signal to noise ratio (SNR) between quanta burst imaging techniques described herein and conventional burst imaging techniques for various combinations of apparent speed in the imaging space and incident photon flux.
FIG. 11B shows a graph of the difference in signal to noise ratio (SNR) between quanta burst imaging techniques described herein and conventional burst imaging techniques as a function of incident photon flux.
FIG. 11C shows a graph of the difference in signal to noise ratio (SNR) between quanta burst imaging techniques described herein and conventional burst imaging techniques as a function of apparent speed in the imaging space.

FIG. 11A shows a plot of the difference in signal to noise ratio (SNR) between quanta burst imaging techniques described herein and conventional burst imaging techniques for various combinations of apparent speed in the imaging space and incident photon flux.

FIG. 11B shows a graph of the difference in signal to noise ratio (SNR) between quanta burst imaging techniques described herein and conventional burst imaging techniques as a function of incident photon flux.

FIG. 11C shows a graph of the difference in signal to noise ratio (SNR) between quanta burst imaging techniques described herein and conventional burst imaging techniques as a function of apparent speed in the imaging space.

In FIGS. 11A to 11C, the difference of SNRs ($SNR_{quanta}$−$SNR_{conv}$) in dB for a wide range of photon fluxes and apparent speeds is plotted in different formats. The imaging parameters of the conventional and quanta image sensors used to generate the analyses are listed below in TABLE 1. At ultra-low light and high movement speeds, quanta burst imaging performs considerably better than conventional burst photography (up to 27.5 dB=23.7 times). On the other hand, in well-lit scenes with negligible motion, quanta burst imaging performs worse (albeit at most by a factor of 0.5) due to lower quantum efficiency and higher dark current noise in current SPAD arrays. Note that the analysis described in connection with FIGS. 11A to 11C is not meant to directly compare capabilities of current single-photon sensors to conventional digital cameras, as conventional CMOS sensor technology is much more mature, and accordingly, such sensors have much higher spatial resolution, and will generally produce higher quality images. However, this analysis can provide guidelines regarding when using quanta burst imaging can be beneficial, when SPAD arrays are available that have spatial resolution that are more comparable to that of currently available conventional CMOS sensors. In some embodiments, the performance of conventional and quanta burst imaging can be characterized in terms of the SNR of the reconstructed linear image sing the following relationship:

$$SNR = 20 \log_{10} \frac{\hat{\phi}}{RMSE(\hat{\phi})}, \quad (8)$$

where $\hat{\phi}$ is the estimated image intensity, and RMSE $\hat{\phi}$ is the root mean squared error of the estimate. It is assumed, for the analysis described in connection with FIGS. 11A to 11C, that the input images are perfectly aligned (no misalignment errors) for both conventional and single-photon image sensors, so that the estimation error is only due to image noise.

TABLE 1

| Sensor Type | Quanta | Conventional |
|---|---|---|
| Resolution | | Same |
| Pixel Pitch | | Same |
| Bit Depth | 1 | 10 |
| Quantum Efficiency (R) | 17% | 59% |
| Quantum Efficiency (G) | 23% | 64% |
| Quantum Efficiency (B) | 21% | 47% |
| Read Noise | 0 | 2.4 |
| Dark Current Noise | — | 1e⁻/s |
| Dark Count Rate | 7.5 cps | — |

Image formation of conventional image sensors can be represented using an affine model, for example, based on the following relationship:

$$I = Z + \epsilon_{rc} + \epsilon_{dc}, \quad (9)$$

where $Z \sim Pois(\phi\tau_c\eta_c)$ is the photon counts as in EQ. (1) ($\tau_c$ and $\eta_c$ are the exposure time and quantum efficiency for the conventional sensor, respectively), $\epsilon_{rc} \sim N(0, \sigma_{rc})$ is the read noise, and $\epsilon_{dc} \sim Pois(\tau_d\eta_c)$ is the dark current noise caused by thermal current with flux $r_d$. These three components are statistically independent of each other. To simplify the analysis, it is assumed that all images are captured at the same ISO speed and temperature such that $\sigma_{rc}$ and $r_d$ are fixed.

If a conventional burst photography algorithm captures a burst of $n_c$ images, the process of merging the $n_c$ captured images into a result image can be viewed as a maximum likelihood estimation process. Assuming the images are perfectly aligned, the $n_c$ images can be merged simply by taking their average, which can be represented by the relationship:

$$\hat{\phi}_c = \frac{1}{n_c\tau_c\eta_c} \sum_{t=1}^{n_c} (I_t - \tau_c r_c), \quad (10)$$

where $I_t$ is the image captured at time t. It is assumed the dark current noise can be calibrated at each pixel. The mean of the calibrated dark current noise is subtracted from the sum of images to give an unbiased estimate of the photon flux (linear intensity image).

From the noise model, the root mean squared error (RMSE) of this estimator due to noise variance, which can be represented by the relationship:

$$RMSE(\hat{\phi}_c) = \sqrt{Var[\hat{\phi}_c]} = \sqrt{\frac{\phi\eta_c + r_c}{T\eta_c^2} + \frac{n_c\sigma_{rc}^2}{T^2\eta_c^2}}, \quad (11)$$

where $T = n_c\tau_c$ is the total exposure time for the sequence.

A maximum likelihood estimator for quanta burst imaging using single-photon detectors is described above in connection with EQ. (5). For a sufficiently long sequence $n_q$ (e.g., $n_q > 30$), the variance of the MLE can be estimated using Fisher information (for example as described in more detail in Appendix A, which has been incorporated by reference herein.), which can be represented by the following relationship:

$$RMSE(\hat{\phi}_q) = \sqrt{Var[\hat{\phi}_q]} \approx \frac{1}{\sqrt{I(\phi)}} = \sqrt{\frac{e^{\phi\tau_q\eta_q + r_q\tau_q} - 1}{n_q\tau_q^2\eta_q^2}}, \quad (12)$$

where $\tau_q$ and $\eta_q$ are the exposure time and quantum efficiency for the single-photon camera.

As shown in EQS. (11) and (12), the RMSE for both modalities depends on the total exposure time T of the image sequence and the total number of frames n, which, in practice, in turn depend on the photon flux level $\phi$ and camera motion: longer exposure is preferred when the light level is low and the camera is moving slowly. For example motion metering techniques can be used which automatically select a total exposure time based on a prediction of future scene and camera motion. In the analysis shown in FIGS. 11A to 11C, it is assumed that the scene properties (e.g., brightness) and camera motion are known or can be estimated such that T and n can be determined according to the following three principles: (1) when the motion is slow, the total exposure time is chosen to meet a target total number of photons to ensure high SNR; (2) when the motion is fast, the total exposure time is limited by a maximum amount of motion across the sequence; (3) and the total number of frames is chosen to ensure the per-frame motion blur is below a threshold. Details about strategies for selecting total exposure time (sometimes referred to herein as a time budget) and number of frames are described in Appendix A, which has been incorporated by reference herein. This makes it possible to express the SNR of both approaches as a function of photon flux and camera motion, which allows direct comparison of the two approaches, as shown in FIG. 11.

Figure 12:
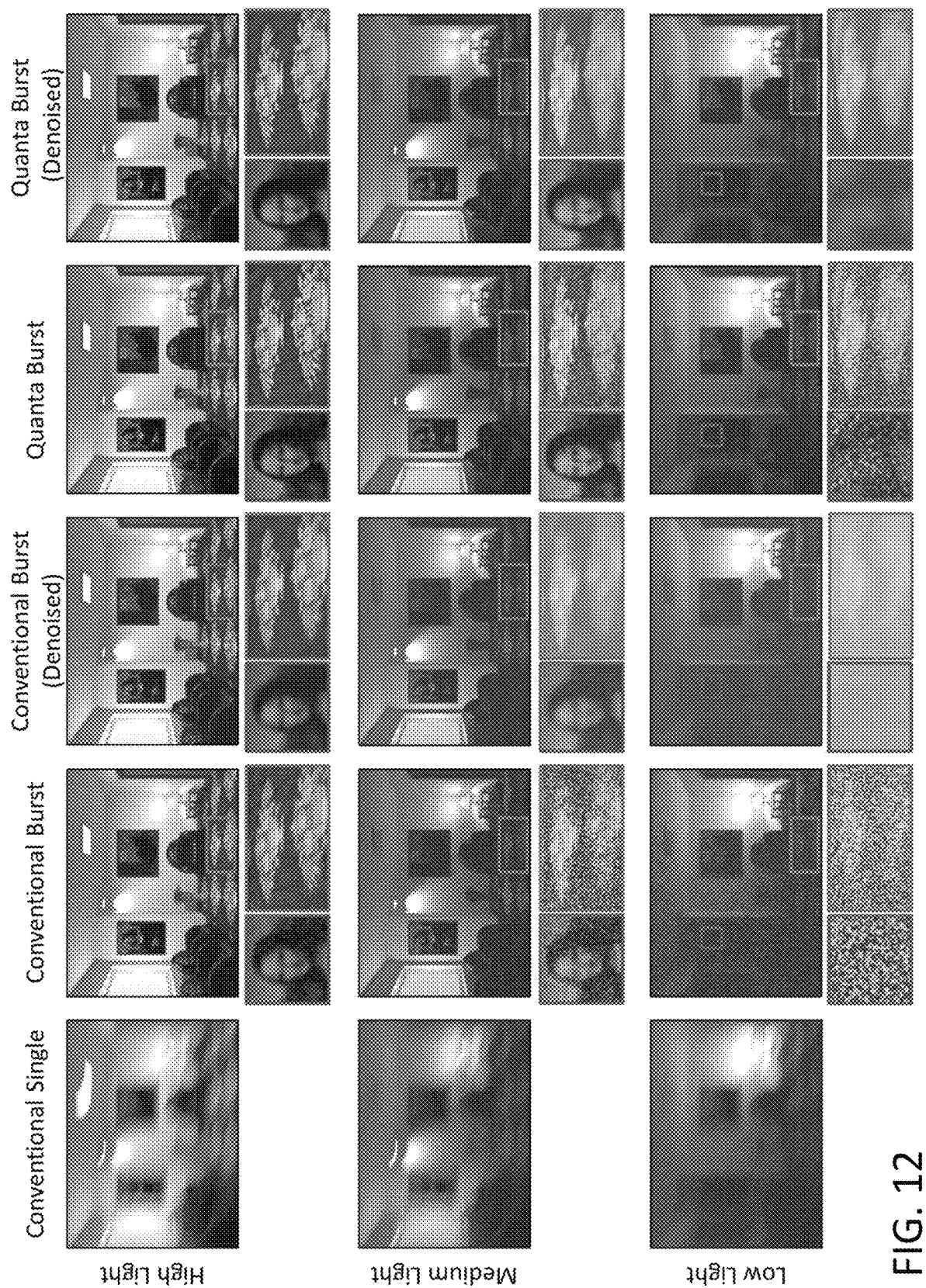
FIG. 12 shows examples of simulated images generated using various imaging techniques and under various lighting conditions.

FIG. 12 shows examples of simulated images generated using various imaging techniques and under various lighting conditions. The imaging process for a camera implemented with a SPAD-based image sensor and a conventional camera of the same resolution and pixel pitch were simulated. Ground-truth linear intensity images were first simulated using a ray tracer (POV-Ray) and then Bernoulli samples were drawn based on EQ. (2) to synthesize binary images. TABLE 1 shows the sensor parameters used for the simulation. The parameters for the conventional sensor are for a high-end machine-vision camera. The parameters for the SPAD camera are based on the SPAD-based image sensor described in Ulku et al., "A 512×512 SPAD Image Sensor with Integrated Gating for Widefield FLIM," which has been incorporated by reference herein. The simulation engine is only capable of generating color images three separate color channels instead of a continuous spectrum. Therefore, the quantum efficiency was taken into account only at three discrete wavelengths: 640 nm (red), 525 nm (green), 470 nm (blue). The photon detection efficiency (PDE) of SPADs was computed by multiplying the photon detection probability (PDP) and the fill factor (assumed to be 50% which can be achieved with microlenses). The sensor described in Ulku does not use a color filter array (e.g., a Bayer color filter array) for color imaging. To simulate RGB images, the PDE was simulated at the three wavelengths by multiplying the experimental measurements of the sensor described in Ulku by 90% (assuming 10% loss due to Bayer filters). Bayer filters and demosaicing process were not simulated, as separate RGB channels were simulated directly. Alignment was performed on a grayscale version of the image and the merging was applied to the three channels independently. The dark count rate was assumed to be spatially uniform (i.e., no hot pixels were included in the simulation).

FIG. 12 includes results for a single-shot conventional image, conventional burst photography, and quanta burst imaging for different lighting conditions. The conventional burst results were generated using an approach similar to conventional burst photography techniques described in Hasinoff et al., "Burst Photography for High Dynamic Range and Low-Light Imaging on Mobile Cameras," ACM Transactions on Graphics, vol. 35, pp. 1-12 (2016), which is hereby incorporated by reference herein in its entirety. The exposure time and number of frames captured for the bursts were determined using the strategy described above in connection with FIGS. 11A to 11C. The scene in FIG. 12 was kept static while the camera was moved. The trajectory of the camera was set to be a linear 3D translation plus a small, smooth, random 6 degrees-of-freedom (DoF) perturbation at each frame. For a scene with sufficient light, both burst approaches generated high-quality images. As the light level goes down, the quality of conventional burst result deteriorates more quickly than quanta burst as the number of incoming photons becomes comparable to the read noise for the conventional CMOS image sensor. In the extremely low light case, the objects in the conventional burst results become completely indiscernible, while in the quanta burst results the rough structures can still be discerned.

Figures 13A, 13B:
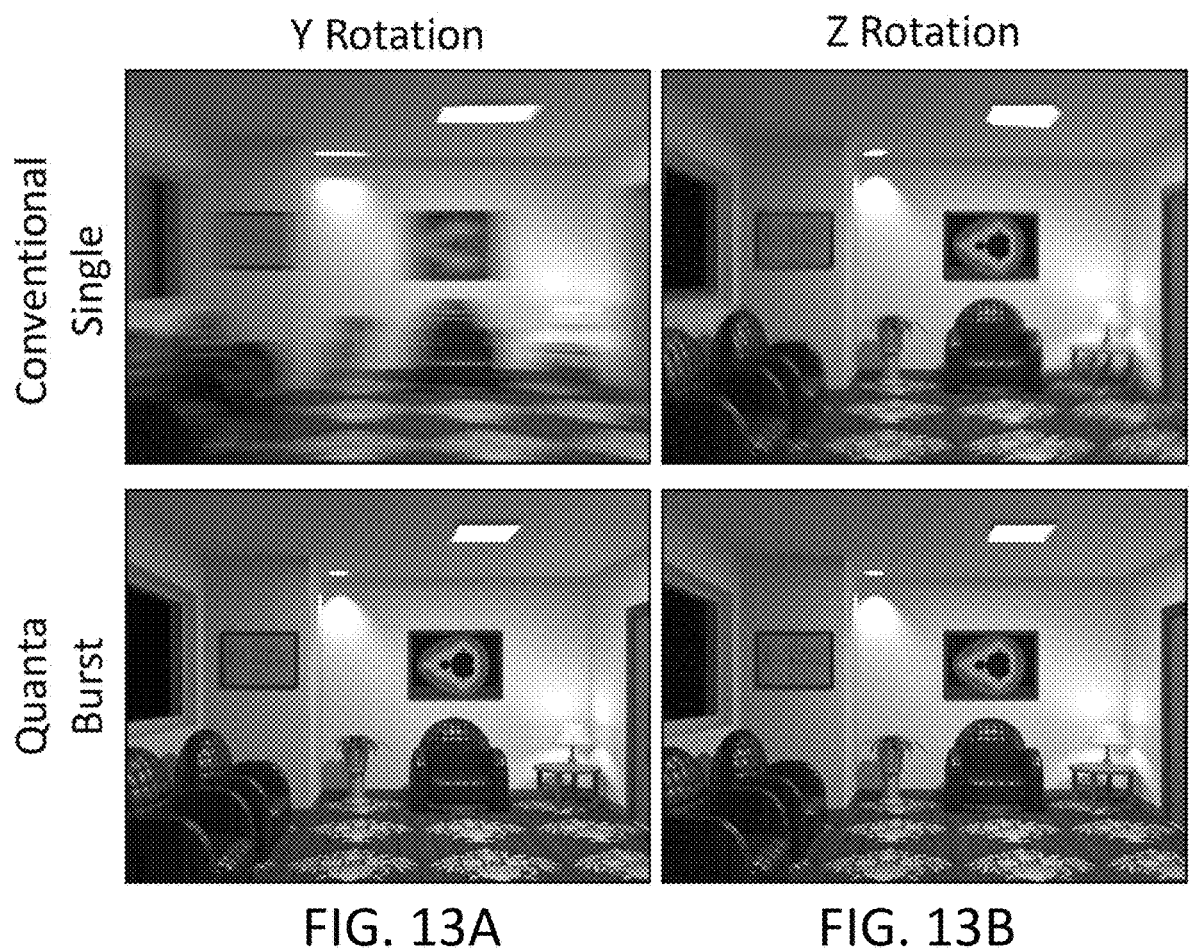
FIG. 13A shows examples of simulated images generated using a conventional single image capture and using quanta burst imaging techniques described herein with a uniform rotation about the y-axis of the simulated camera.
FIG. 13B shows examples of simulated images generated using a conventional single image capture and using quanta burst imaging techniques described herein with a uniform rotation about the z-axis of the simulated camera.

FIG. 13A shows examples of simulated images generated using a conventional single image capture and using quanta burst imaging techniques described herein with a uniform rotation about the y-axis of the simulated camera.

FIG. 13B shows examples of simulated images generated using a conventional single image capture and using quanta burst imaging techniques described herein with a uniform rotation about the z-axis of the simulated camera.

Figures 13C, 13D:
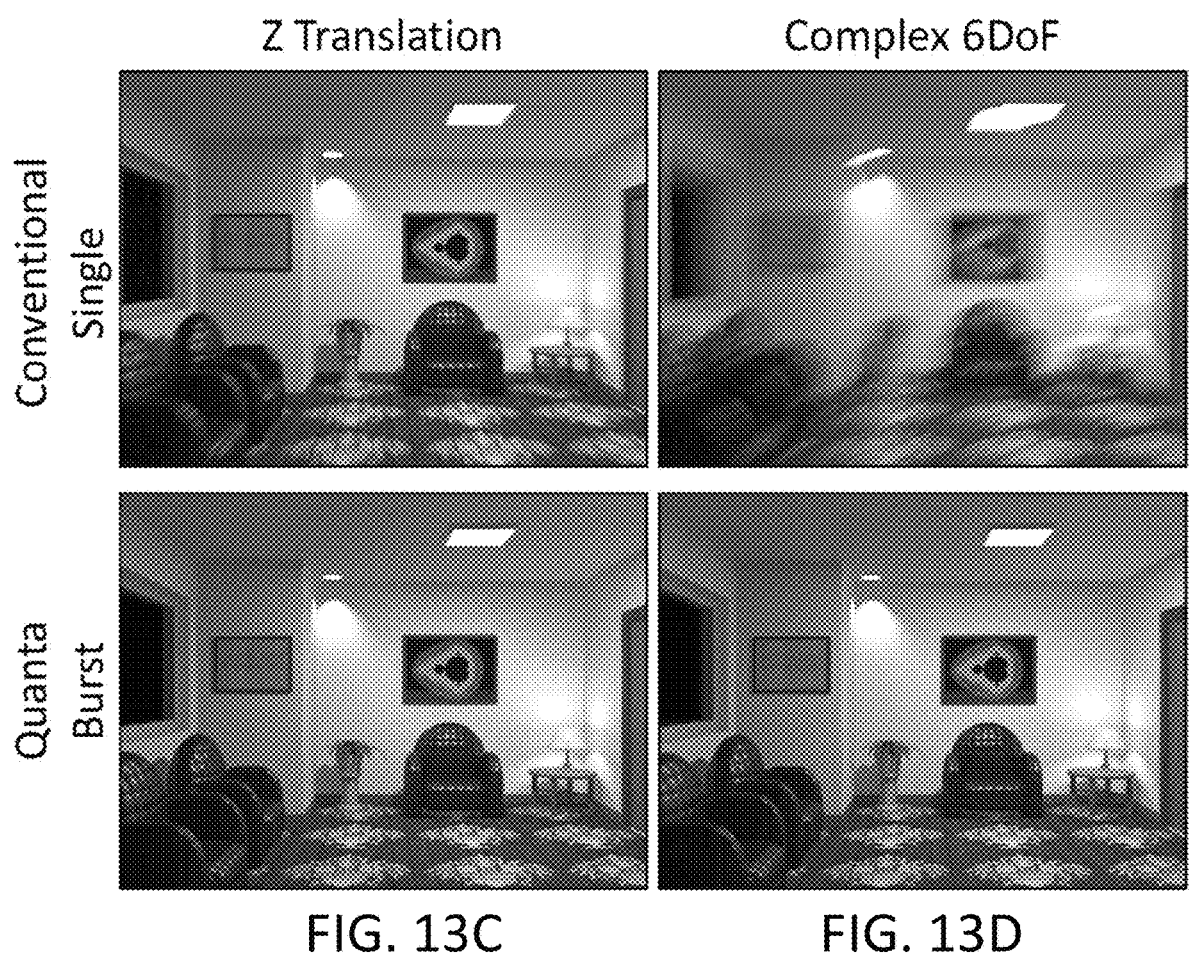
FIG. 13C shows examples of simulated images generated using a conventional single image capture and using quanta burst imaging techniques described herein with a uniform translation along the z-axis of camera away from the scene.
FIG. 13D shows examples of simulated images generated using a conventional single image capture and using quanta burst imaging techniques described herein with a complex 6 degree of freedom movement applied to the simulated camera.

FIG. 13C shows examples of simulated images generated using a conventional single image capture and using quanta burst imaging techniques described herein with a uniform translation along the z-axis of camera away from the scene.

FIG. 13D shows examples of simulated images generated using a conventional single image capture and using quanta burst imaging techniques described herein with a complex 6 degree of freedom movement applied to the simulated camera.

FIGS. 13A to 13D show quanta burst reconstruction results for different types of camera motion. In all cases, relatively blur-free images are reconstructed.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the process of FIG. 7 can be executed or performed in any suitable order or sequence not limited to the order and sequence shown and described in the figures. Also, some of the above steps of the process of FIG. 7 can be executed or performed substantially simultaneously where appropriate or in parallel to reduce latency and processing times.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for generating digital images, comprising:
an image sensor comprising a plurality of detectors configured to detect arrival of individual photons, the plurality of detectors arranged in an array;
a display;

at least one processor that is programmed to:
divide a sequence of images generated by the image sensor into a plurality of blocks, including a reference block, a first auxiliary block, and a second auxiliary block, such that a set of images is associated with each of the plurality of blocks, wherein each of the images comprises a plurality of pixels;
generate a reference block-sum image based on a sum of the set of images associated with the reference block, such that each pixel of the reference block-sum image is associated with a value corresponding to a number of photon detections at that pixel in the set of images;
generate a first auxiliary block-sum image based on a sum of the set of images associated with the first auxiliary block, such that each pixel of the first auxiliary block-sum image is associated with a value corresponding to a number of photon detections at that pixel in the set of images;
generate a second auxiliary block-sum image based on a sum of the set of images associated with the second auxiliary block, such that each pixel of the second auxiliary block-sum image is associated with a value corresponding to a number of photon detections at that pixel in the set of images;
determine an alignment between the first auxiliary block-sum image and the reference block-sum image;
determine an alignment between the second auxiliary block-sum image and the reference block-sum image;
generate a first set of warped images by warping at least a first subset of images in the set of images associated with the first auxiliary block based on the alignment between the first auxiliary image and the reference block-sum image;
generate a first warped block-sum image based on the first set of warped images;
generate a second set of warped images by warping at least a second subset of images in the set of images associated with the second auxiliary block based on the alignment between the second auxiliary image and the reference block-sum image;
generate a second warped block-sum image based on the second set of warped images;
generate a third set of warped images by warping at least a third subset of images in the set of images associated with the reference block based on an alignment between the reference block-sum image and an adjacent block-sum image;
generate a third warped block-sum image based on the third set of warped images;
merge a plurality of warped block-sum images, including at least the first warped block-sum image, the second warped block-sum image, and the third warped block-sum image; and
cause the display to present a final image of the scene based on the merged plurality of warped block-sum images.

2. The system of claim 1, wherein each of the plurality of detectors comprises a single photon avalanche diode (SPAD).

3. The system of claim 1, wherein each of the images represents photons detected by the image sensor during an exposure time $\tau$,
for each image,
the plurality of pixels consists of a first subset of pixels each having a value of 1, and a second subset of pixels each having a value of 0,
the first subset of pixels corresponding to detectors that detected a photon during exposure time $\tau$, and
the second subset of pixels corresponding to detectors that did not detect any photons during exposure time $\tau$.

4. The system of claim 1, wherein each of the plurality of pixels of each image has a position (x, y),
the reference block-sum image comprises a plurality of pixels, each having a position (x, y),
each of the plurality of pixels of the reference block-sum image having a value based on the relationship:

$$S(x, y) = \sum_{t=i}^{j} B_t(x, y),$$

where $B_t(x,y)$ is the image at time t, the reference block includes images captured between times i and j, and S(x, y) is the total number of photons detected at (x, y) over the set of images associated with the reference block.

5. The system of claim 1, wherein the at least one processor that is further programmed to:
generate a reference block-sum pyramid based on the reference block-sum image, wherein the reference block-sum pyramid comprises a plurality of representations of the reference block-sum image at a respective plurality of resolutions;
generate a first auxiliary block-sum pyramid based on the first auxiliary block-sum image, wherein the first auxiliary block-sum pyramid comprises a plurality of representations of the first auxiliary block-sum image at a respective plurality of resolutions;
generate a second auxiliary block-sum pyramid based on the second auxiliary block-sum image, wherein the second auxiliary block-sum pyramid comprises a plurality of representations of the second auxiliary block-sum image at a respective plurality of resolutions;
perform a hierarchical patch-based matching between the reference block-sum pyramid and the first auxiliary block-sum pyramid;
determine the alignment between the first auxiliary block-sum image and the reference block-sum image based on the hierarchical patch-based matching;
perform a hierarchical patch-based matching between the reference block-sum pyramid and the second auxiliary block-sum pyramid; and
determine the alignment between the second auxiliary block-sum image and the reference block-sum image based on the hierarchical patch-based matching.

6. The system of claim 1, wherein the at least one processor that is further programmed to:
determine weights to assign to pixels of each of the plurality of warped block-sum images by applying Wiener frequency-domain filtering;
assign the weights to the pixels of each of the plurality of warped block-sum images; and
combine the warped block-sum images, such that the merged plurality of warped block-sum images is the sum of weighted warped block sum images and represents the total number of photons detected at each pixel location.

7. The system of claim 1, wherein the at least one processor that is further programmed to:

estimate an image intensity $\hat{\phi}$ for each of the plurality of pixels of the merged plurality of warped block-sum images based on a total number of photons S(x, y) detected at each pixel location (x, y) using the relationship:

$$\hat{\phi}(x,y) = -\ln(1 - S(x,y)/n_q)/\tau\eta - r_q(x,y)/\eta$$

where $n_q$ is a total number of images in the sequence of images, $\tau$ is an exposure time of each image, $\eta$ is a quantum efficiency of each of the plurality of detectors, and $r_q(x, y)$ is a dark count rate of the pixel at location (x, y).

8. The system of claim 1, wherein the at least one processor that is further programmed to:
   calculate a motion field for the first auxiliary block based on the alignment between the first auxiliary block and the reference block;
   perform a linear interpolation between the motion field and a motion field associated with an adjacent block; and
   determine a motion field for each image in the first subset of images based on the linear interpolation.

9. The system of claim 1, wherein the image sensor further comprises a plurality of color filters arranged in a Bayer pattern, such that each of the plurality of detectors is associated with a red filter, a green filter, or a blue filter; and wherein the at least one processor is further programmed to:
   generate the reference block-sum image by
      generating a summation of the set of images associated with the reference block, and
      downsampling the summation of the set of images associated with the reference block by
         combining groups of four adjacent pixels corresponding to two green filters, one red filter, and one blue filter, such that the reference block-sum image is a downsampled grayscale representation of the reference block;
   generate the first auxiliary block-sum image by
      generating a summation of the set of images associated with the first auxiliary block, and
      downsampling the summation of the set of images associated with the first auxiliary block by
         combining groups of four adjacent pixels corresponding to two green filters, one red filter, and one blue filter, such that the reference block-sum image is a downsampled grayscale representation of the first auxiliary block;
   generate a second auxiliary block-sum image by
      generating a summation of the set of images associated with the second auxiliary block, and
      downsampling the summation of the set of images associated with the second auxiliary block by
         combining groups of four adjacent pixels corresponding to two green filters, one red filter, and one blue filter, such that the reference block-sum image is a downsampled grayscale representation of the second auxiliary block;
   generate a first set of warped block-sum images based on the first set of warped images, wherein the first set of warped block-sum images includes the first warped block-sum image, a first blue warped block-sum image, and a first red warped block-sum image, the first warped block-sum image based on only green pixels, the first blue warped block-sum image based on only blue pixels, and the first red warped block-sum image based on only red pixels;
   generate a set of second warped block-sum images based on the second set of warped images, wherein the second set of warped block-sum images includes the second warped block-sum image, a second blue warped block-sum image, and a second red warped block-sum image;
   generate a set of third warped block-sum images based on the third set of warped images, wherein the third set of warped block-sum images includes the third warped block-sum image, a third blue warped block-sum image, and a third red warped block-sum image;
   merge the plurality of warped block-sum images to generate a green color sum image;
   merge a second plurality of warped block-sum images, including the first blue warped block-sum image, the second blue warped block-sum image, and the third blue warped block-sum image, to generate a blue color sum image;
   merge a third plurality of warped block-sum images, including the first red warped block-sum image, the second red warped block-sum image, and the third red warped block-sum image, to generate a blue color sum image; and
   generate the final image based on a combination of the green color sum image, the blue color sum image, and the red color sum image.

10. A method for generating digital images, comprising:
   dividing a sequence of images generated by an image sensor into a plurality of blocks, including a reference block, a first auxiliary block, and a second auxiliary block, such that a set of images is associated with each of the plurality of blocks, wherein the image sensor comprises a plurality of detectors configured to detect arrival of individual photons, the plurality of detectors arranged in an array, and wherein each of the images comprises a plurality of pixels;
   generating a reference block-sum image based on a sum of the set of images associated with the reference block, such that each pixel of the reference block-sum image is associated with a value corresponding to a number of photon detections at that pixel in the set of images;
   generating a first auxiliary block-sum image based on a sum of the set of images associated with the first auxiliary block, such that each pixel of the first auxiliary block-sum image is associated with a value corresponding to a number of photon detections at that pixel in the set of images;
   generating a second auxiliary block-sum image based on a sum of the set of images associated with the second auxiliary block, such that each pixel of the second auxiliary block-sum image is associated with a value corresponding to a number of photon detections at that pixel in the set of images;
   determining an alignment between the first auxiliary block-sum image and the reference block-sum image;
   determining an alignment between the second auxiliary block-sum image and the reference block-sum image;
   generating a first set of warped images by warping at least a first subset of images in the set of images associated with the first auxiliary block based on the alignment between the first auxiliary image and the reference block-sum image;
   generating a first warped block-sum image based on the first set of warped images;
   generating a second set of warped images by warping at least a second subset of images in the set of images associated with the second auxiliary block based on the alignment between the second auxiliary image and the reference block-sum image;

generating a second warped block-sum image based on the second set of warped images;

generating a third set of warped images by warping at least a third subset of images in the set of images associated with the reference block based on an alignment between the reference block-sum image and an adjacent block-sum image;

generating a third warped block-sum image based on the third set of warped images;

merging a plurality of warped block-sum images, including at least the first warped block-sum image, the second warped block-sum image, and the third warped block-sum image; and causing a display to present a final image of the scene based on the merged plurality of warped block-sum images.

11. The method of claim 10, wherein each of the plurality of pixels of each image has a position (x, y), the reference block-sum image comprises a plurality of pixels, each having a position (x, y), each of the plurality of pixels of the reference block-sum image having a value based on the relationship:

$$S(x, y) = \sum_{t=i}^{j} B_t(x, y),$$

where $B_t(x,y)$ is the image at time t, the reference block includes images captured between times i and j, and S(x, y) is the total number of photons detected at (x, y) over the set of images associated with the reference block.

12. The method of claim 10, further comprising:

generating a reference block-sum pyramid based on the reference block-sum image, wherein the reference block-sum pyramid comprises a plurality of representations of the reference block-sum image a respective plurality of resolutions;

generating a first auxiliary block-sum pyramid based on the first auxiliary block-sum image, wherein the first auxiliary block-sum pyramid comprises a plurality of representations of the first auxiliary block-sum image a respective plurality of resolutions;

generating a second auxiliary block-sum pyramid based on the second auxiliary block-sum image, wherein the second auxiliary block-sum pyramid comprises a plurality of representations of the second auxiliary block-sum image a respective plurality of resolutions;

wherein determining the alignment between the first auxiliary block-sum image and the reference block-sum image comprises:

performing a hierarchical patch-based matching between the reference block-sum pyramid and the first auxiliary block-sum pyramid;

determining the alignment between the first auxiliary block-sum image and the reference block-sum image based on the hierarchical patch-based matching; and wherein determining the alignment between the second auxiliary block-sum image and the reference block-sum image comprises:

performing a hierarchical patch-based matching between the reference block-sum pyramid and the second auxiliary block-sum pyramid; and determining the alignment between the second auxiliary block-sum image and the reference block-sum image based on the hierarchical patch-based matching.

13. The method of claim 10, wherein merging the plurality of warped block-sum images comprises:

determining weights to assign to pixels of each of the plurality of warped block-sum images by applying Wiener frequency-domain filtering;

assigning the weights to the pixels of each of the plurality of warped block-sum images; and combining the warped block-sum images, such that the merged plurality of warped block-sum images is the sum of weighted warped block sum images and represents the total number of photons detected at each pixel location.

14. The method of claim 10, further comprising:

estimating an image intensity $\hat{\phi}$ for each of the plurality of pixels of the merged plurality of warped block-sum images based on a total number of photons S(x, y) detected at each pixel location (x, y) using the relationship:

$$\hat{\phi}(x,y) = -\ln(1 - S(x,y)/n_q)/\tau\eta - r_q(x,y)/\eta$$

where $n_q$ is a total number of images in the sequence of images, $\tau$ is an exposure time of each image, $\eta$ is a quantum efficiency of each of the plurality of detectors, and $r_q(x, y)$ is a dark count rate of the pixel at location (x, y).

15. The method of claim 10, further comprising:

calculating a motion field for the first auxiliary block based on the alignment between the first auxiliary block and the reference block;

performing a linear interpolation between the motion field and a motion field associated with an adjacent block; and determining a motion field for each image in the first subset of images based on the linear interpolation.

16. A non-transitory computer readable medium containing computer executable instructions that, when executed by a processor, cause the processor to perform a method for generating digital images, the method comprising:

dividing a sequence of images generated by an image sensor into a plurality of blocks, including a reference block, a first auxiliary block, and a second auxiliary block, such that a set of images is associated with each of the plurality of blocks, wherein the image sensor comprises a plurality of detectors configured to detect arrival of individual photons, the plurality of detectors arranged in an array, and wherein each of the images comprises a plurality of pixels;

generating a reference block-sum image based on a sum of the set of images associated with the reference block, such that each pixel of the reference block-sum image is associated with a value corresponding to a number of photon detections at that pixel in the set of images;

generating a first auxiliary block-sum image based on a sum of the set of images associated with the first auxiliary block, such that each pixel of the first auxiliary block-sum image is associated with a value corresponding to a number of photon detections at that pixel in the set of images;

generating a second auxiliary block-sum image based on a sum of the set of images associated with the second auxiliary block, such that each pixel of the second auxiliary block-sum image is associated with a value corresponding to a number of photon detections at that pixel in the set of images;

determining an alignment between the first auxiliary block-sum image and the reference block-sum image;

determining an alignment between the second auxiliary block-sum image and the reference block-sum image;

generating a first set of warped images by warping at least a first subset of images in the set of images associated with the first auxiliary block based on the alignment between the first auxiliary image and the reference block-sum image;

generating a first warped block-sum image based on the first set of warped images;

generating a second set of warped images by warping at least a second subset of images in the set of images associated with the second auxiliary block based on the alignment between the second auxiliary image and the reference block-sum image;

generating a second warped block-sum image based on the second set of warped images;

generating a third set of warped images by warping at least a third subset of images in the set of images associated with the reference block based on an alignment between the reference block-sum image and an adjacent block-sum image;

generating a third warped block-sum image based on the third set of warped images;

merging a plurality of warped block-sum images, including at least the first warped block-sum image, the second warped block-sum image, and the third warped block-sum image; and causing a display to present a final image of the scene based on the merged plurality of warped block-sum images.

17. The non-transitory computer readable medium of claim 16, the method further comprising:

generating a reference block-sum pyramid based on the reference block-sum image, wherein the reference block-sum pyramid comprises a plurality of representations of the reference block-sum image a respective plurality of resolutions;

generating a first auxiliary block-sum pyramid based on the first auxiliary block-sum image, wherein the first auxiliary block-sum pyramid comprises a plurality of representations of the first auxiliary block-sum image a respective plurality of resolutions;

generating a second auxiliary block-sum pyramid based on the second auxiliary block-sum image, wherein the second auxiliary block-sum pyramid comprises a plurality of representations of the second auxiliary block-sum image a respective plurality of resolutions;

wherein determining the alignment between the first auxiliary block-sum image and the reference block-sum image comprises:

performing a hierarchical patch-based matching between the reference block-sum pyramid and the first auxiliary block-sum pyramid;

determining the alignment between the first auxiliary block-sum image and the reference block-sum image based on the hierarchical patch-based matching; and wherein determining the alignment between the second auxiliary block-sum image and the reference block-sum image comprises:

performing a hierarchical patch-based matching between the reference block-sum pyramid and the second auxiliary block-sum pyramid; and determining the alignment between the second auxiliary block-sum image and the reference block-sum image based on the hierarchical patch-based matching.

18. The non-transitory computer readable medium of claim 16, wherein merging the plurality of warped block-sum images comprises:

determining weights to assign to pixels of each of the plurality of warped block-sum images by applying Wiener frequency-domain filtering;

assigning the weights to the pixels of each of the plurality of warped block-sum images; and combining the warped block-sum images, such that the merged plurality of warped block-sum images is the sum of weighted warped block sum images and represents the total number of photons detected at each pixel location.

19. The non-transitory computer readable medium of claim 16, the method further comprising:

estimating an image intensity $\hat{\phi}$ for each of the plurality of pixels of the merged plurality of warped block-sum images based on a total number of photons $S(x, y)$ detected at each pixel location $(x, y)$ using the relationship:

$$\hat{\phi}(x,y)=-\ln(1-S(x,y)/n_q)/\tau\eta-r_q(x,y)/\eta$$

where $n_q$ is a total number of images in the sequence of images, $\tau$ is an exposure time of each image, $\eta$ is a quantum efficiency of each of the plurality of detectors, and $r_q(x, y)$ is a dark count rate of the pixel at location $(x, y)$.

20. The non-transitory computer readable medium of claim 16, the method further comprising:

calculating a motion field for the first auxiliary block based on the alignment between the first auxiliary block and the reference block;

performing a linear interpolation between the motion field and a motion field associated with an adjacent block; and determining a motion field for each image in the first subset of images based on the linear interpolation.

* * * * *